(12) United States Patent
Tanaka et al.

(10) Patent No.: US 8,320,735 B2
(45) Date of Patent: Nov. 27, 2012

(54) REPRODUCING APPARATUS

(75) Inventors: Keiichi Tanaka, Osaka (JP); Hidetaka Ohto, Hyogo (JP)

(73) Assignee: Panasonic Corporation, Osaka (JP)

( * ) Notice: Subject to any disclaimer, the term of this patent is extended or adjusted under 35 U.S.C. 154(b) by 385 days.

(21) Appl. No.: 12/523,081

(22) PCT Filed: Jan. 23, 2008

(86) PCT No.: PCT/JP2008/050898
§ 371 (c)(1),
(2), (4) Date: Jul. 14, 2009

(87) PCT Pub. No.: WO2008/099647
PCT Pub. Date: Aug. 21, 2008

(65) Prior Publication Data
US 2010/0061702 A1    Mar. 11, 2010

(30) Foreign Application Priority Data
Feb. 16, 2007    (JP) .................................. 2007-036110

(51) Int. Cl.
H04N 9/80    (2006.01)
H04N 5/76    (2006.01)
(52) U.S. Cl. .......................... 386/239; 386/235; 386/241
(58) Field of Classification Search .................. None
See application file for complete search history.

(56) References Cited

U.S. PATENT DOCUMENTS

| | | | |
|---|---|---|---|
| 5,307,494 A | 4/1994 | Yasumatsu et al. | |
| 2001/0014892 A1* | 8/2001 | Gaither et al. | 707/200 |
| 2005/0177626 A1* | 8/2005 | Freiburg et al. | 709/219 |
| 2006/0098936 A1 | 5/2006 | Ikeda et al. | |
| 2006/0133223 A1* | 6/2006 | Nakamura et al. | 369/30.3 |
| 2008/0225658 A1 | 9/2008 | Suguta et al. | |

FOREIGN PATENT DOCUMENTS

| | | |
|---|---|---|
| EP | 1860569 | 11/2007 |
| JP | 64-41039 | 2/1989 |
| JP | 2006-33067 | 2/2006 |
| JP | 2006-109494 | 4/2006 |
| JP | 2007-20211 | 1/2007 |
| WO | 2006/100879 | 9/2006 |

OTHER PUBLICATIONS

English language Abstract of JP 64-41039, Feb. 13, 1989.
English language Abstract of JP 2006-109494, Apr. 20, 2006.
English language Abstract of JP 2007-20211, Jan. 25, 2007.
English language Abstract of JP 2006-33067, Feb. 2, 2006.
Kozuka et al., "Controlling AV freely with Blu-ray Java, while preventing unauthorized tampering", Interactive Operation Function for Next Generation Optical Disc (3), Nikkei Electronics (933), Sep. 11, 2006, pp. 148-152.

* cited by examiner

*Primary Examiner* — William C Vaughn, Jr.
*Assistant Examiner* — Heather Jones
(74) *Attorney, Agent, or Firm* — Greenblum & Bernstein, P.L.C.

(57) ABSTRACT

A playback device generates a virtual package in response to a construction request made by an application. After the virtual package is thus generated, a virtual file system 23 allows a file recorded on a removable medium in an 8.3 format to be accessed with use of an alias in a Long File Name format, based on a merge management information file that indicates a correspondence between a file path in the 8.3 format and a file path in the Long File Name format.

11 Claims, 31 Drawing Sheets

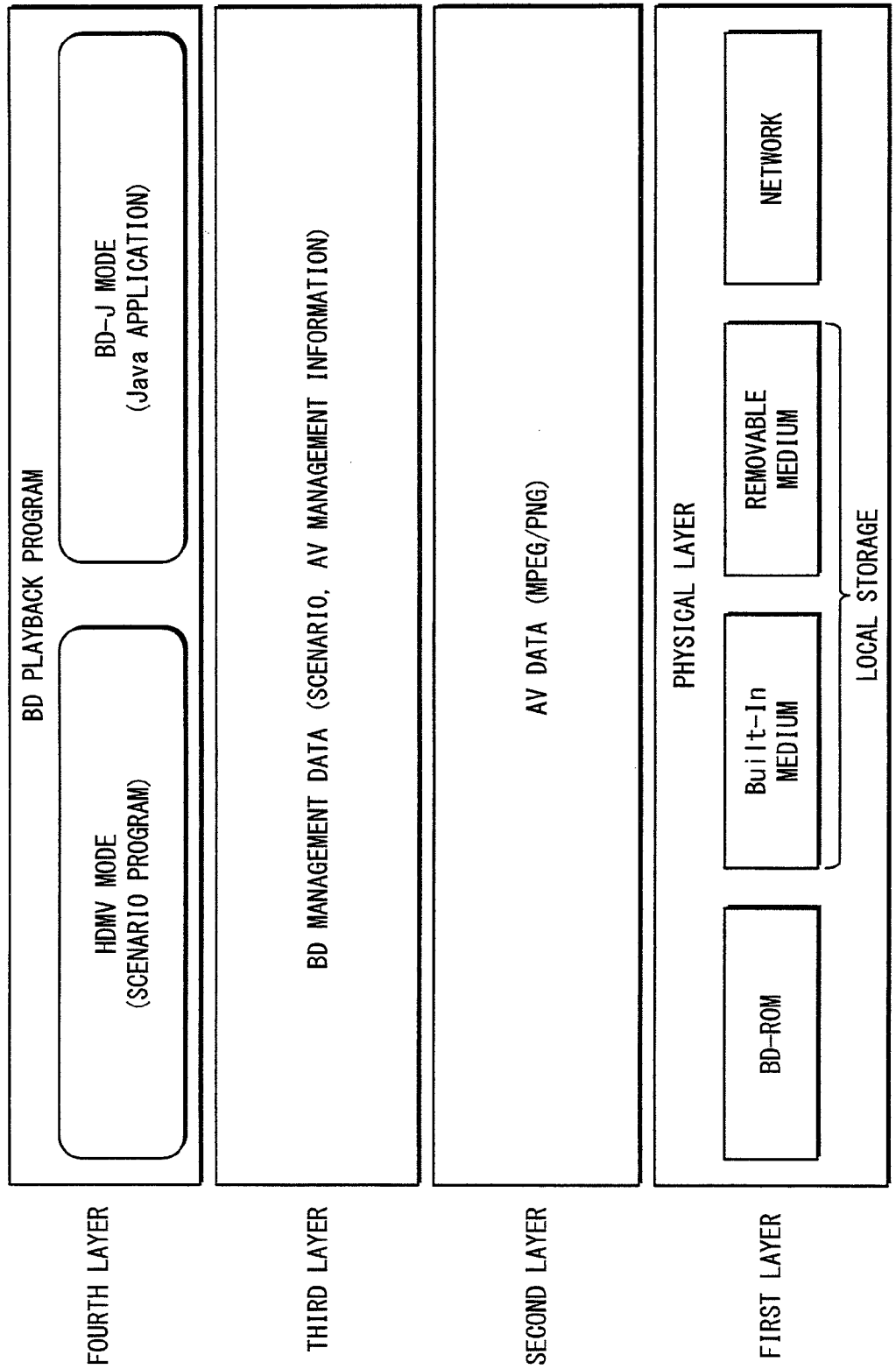

NORMAL PLAYBACK IN HDMV MODE

ENHANCING ADDED VALUE IN BD-J MODE

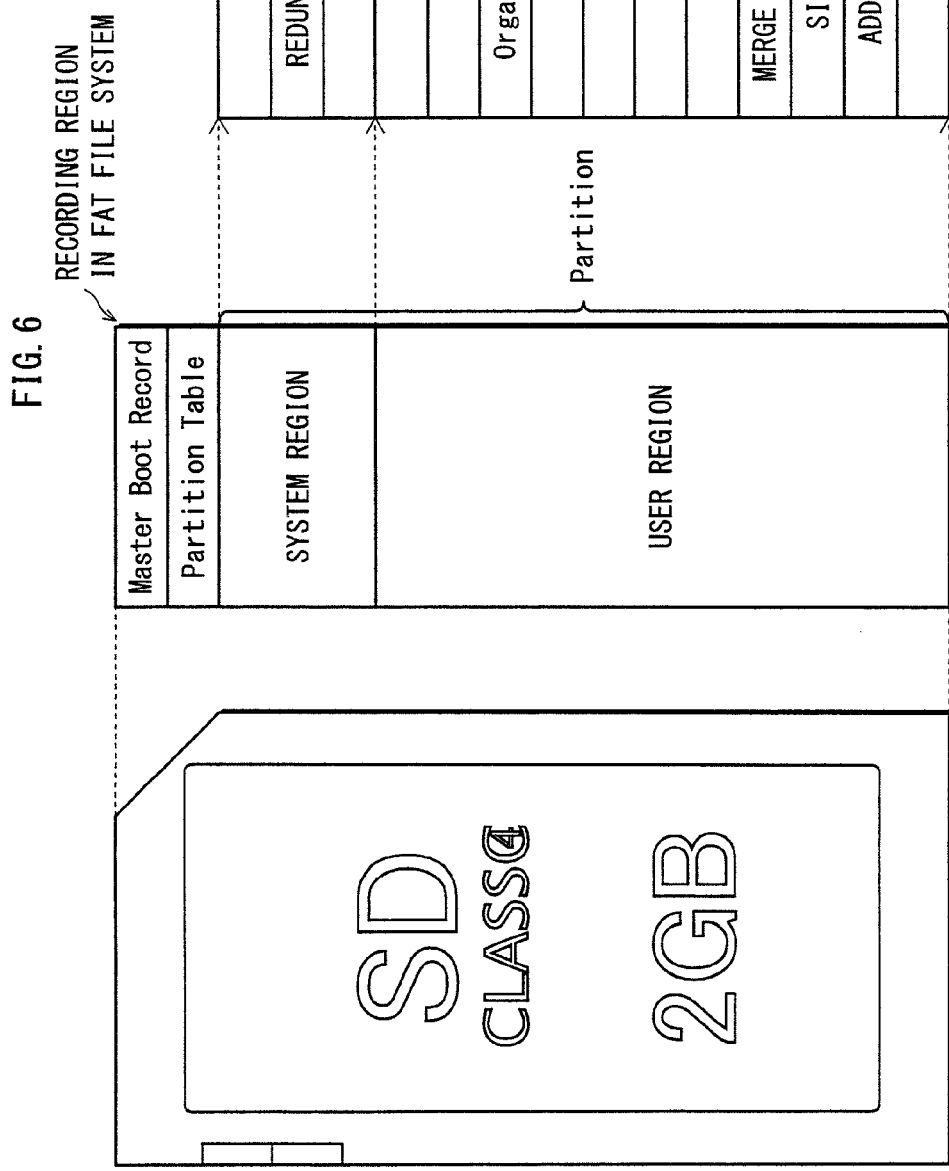

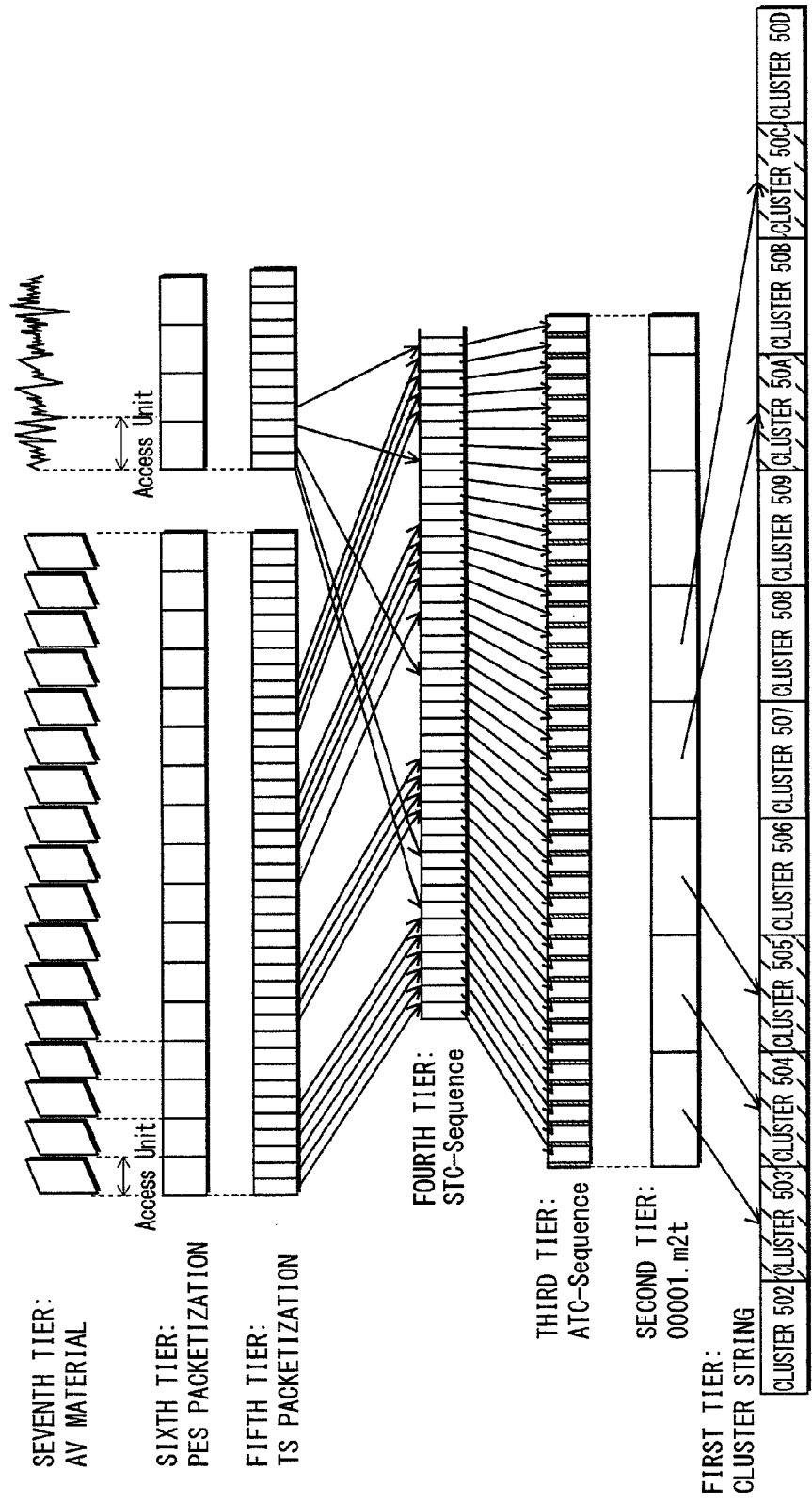

FIG. 9

DiscID DIRECTORY ENTRY

| FILE NAME | FILE EXTENSION | FILE'S FIRST CLUSTER NUMBER |
|---|---|---|
| 00001 | m2t | 503 |

FAT ENTRY 500-506

| FAT ENTRY 500 | FAT ENTRY 501 | FAT ENTRY 502 | FAT ENTRY 503 (504) ① | FAT ENTRY 504 (505) ② | FAT ENTRY 505 (50A) ③ | FAT ENTRY 506 |

CLUSTER 502-506

| CLUSTER 502 | CLUSTER 503 | CLUSTER 504 | CLUSTER 505 | CLUSTER 506 |

FAT ENTRY 507-50D

| FAT ENTRY 507 | FAT ENTRY 508 | FAT ENTRY 509 | FAT ENTRY 50A (50C) ④ | FAT ENTRY 50B | FAT ENTRY 50C (FFF) ⑤ | FAT ENTRY 50D |

CLUSTER 507-50D

| CLUSTER 507 | CLUSTER 508 | CLUSTER 509 | CLUSTER 50A | CLUSTER 50B | CLUSTER 50C | CLUSTER 50D | fk1, fk2, fk3, fk4, fk5

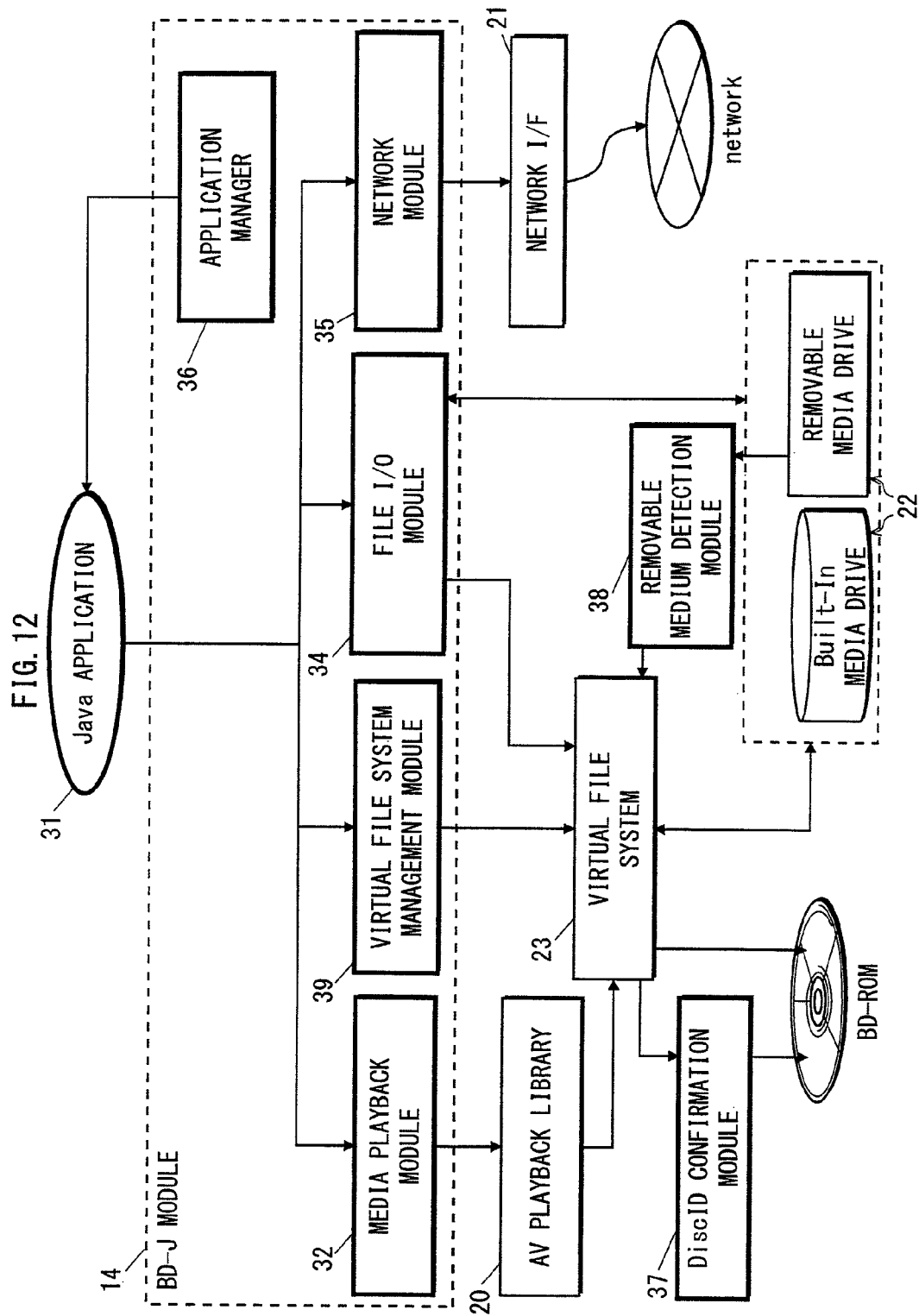

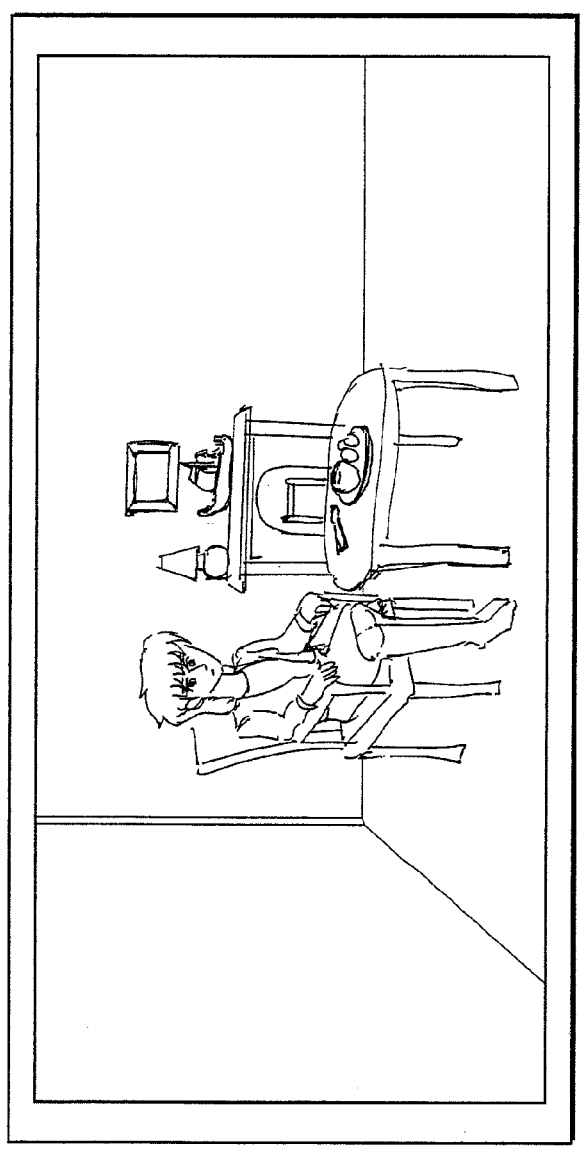
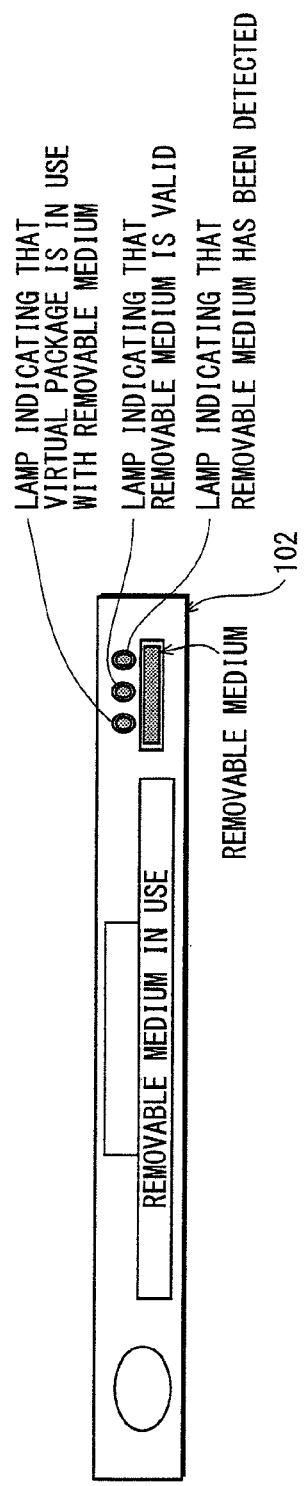
FIG. 24
PLAYBACK OF VIRTUAL PACKAGE WITH USE OF REMOVABLE MEDIUM

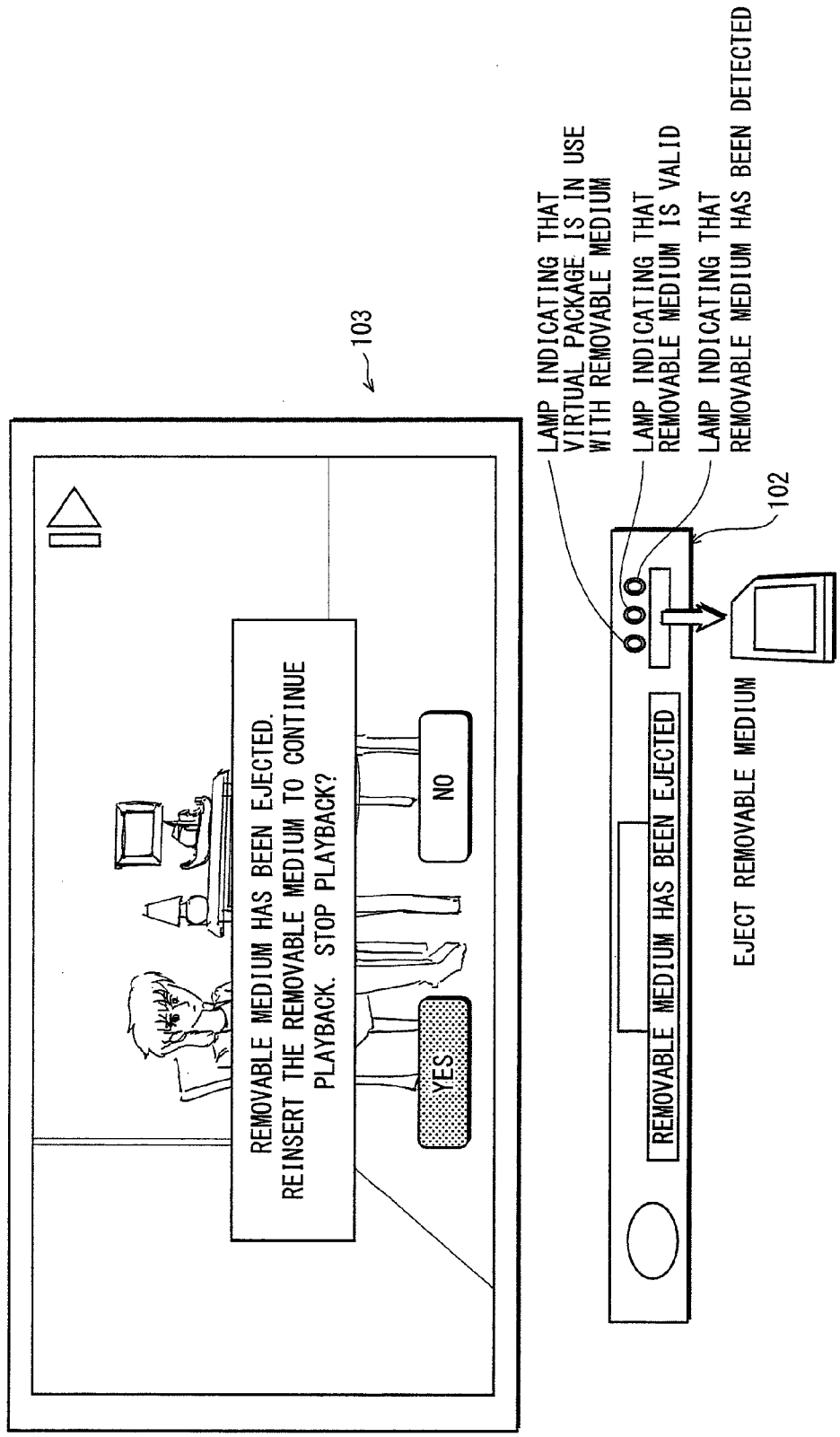

REPRODUCING APPARATUS

TECHNICAL FIELD

The present invention relates to a technical field of virtual packages.

BACKGROUND ART

A virtual package is a technology aimed to expand the content of a read-only recording medium, by constructing a virtual package by dynamically combining data recorded on a read-only recording medium such as BD-ROM, with data recorded on a rewritable recording medium such as a hard disk. In such technologies, data recorded on a rewritable hard disk is updated, so that a work recorded on a BD-ROM can be changed even after the BD-ROM is distributed. For example, a provider of movie works can provide a digital stream of previews of the latest movies via a network, even after having distributed BD-ROMs on which the main part of a movie is stored. This makes it possible to advertise the latest movies to the users regardless of the timing of the distribution of the BD-ROMs.

The following Patent Documents 1, 2, and 3 describe conventional technologies related to a virtual package.

Patent Document 1: Japanese Patent Application Publication No. 2006-109494

Patent Document 2: Japanese Patent Application Publication No. 2007-20211

Patent Document 3: Japanese Patent Application Publication No. 2006-33067

DISCLOSURE OF THE INVENTION

The Problems the Invention is Going to Solve

When additional data for constructing a virtual package is acquired by downloading, a file storing the additional data is usually stored in a hard disk in a playback device. However, in a case where the downloading is performed by a personal computer, etc. other than the playback device, various types of removable media may be selected for storing the downloaded data. Here, the removable recording media are portable recording media, such as SD memory cards, memory sticks, compact flashes(™), SmartMedia, and MultiMedia cards. A usage pattern, in which a file downloaded from a personal computer is written onto a removable package medium, and the removable package medium is mounted in a playback device so as to play back a virtual package, is expected to increase in the future.

The following describes a case where additional data of data recorded on a BD-ROM is downloaded from a personal computer and recorded on a removable medium. Since a file recorded on the BD-ROM is in a Long File Name (LFN) format, the name of the file includes 10 or 20 characters, and the extension of the file includes 5 or 6 characters. However, when the additional data is recorded onto the removable medium, there is a tendency to restrict a file name up to 8 characters, a directory name up to 8 characters, and an extension up to 3 characters. This is due to the restriction of the file system of the removable medium.

Since the removable medium has the above-described restriction, it is not allowed to provide the file storing the additional data with the same name as the file name used in the BD-ROM. Here, one possible way to deal with this problem is to provide the file storing the additional data with a shorter file name and record the file onto the removable medium. However, if a user applies an abbreviated file name to suit his/her own convenience, it is impossible to determine, from the abbreviated file name, which file among files having 8 characters or less is associated with the file name in the LFN format.

Especially in the BD-ROM standard, characters that form a directory name in the LFN format or characters that form a file name in the LFN format often have a particular meaning. Furthermore, if one or more of these characters are missing, the removable medium may be confused with another recording medium, and also an encryption process, decryption process and authentication process for copyright protection may not be performed normally. Although the abbreviation is made to a file in order to record the additional data onto the removable medium, such abbreviation leads to problems such as a trouble in compatibility in standard, confusion with a similar recording medium, and a trouble in an encryption process, decryption process, and authentication process for copyright protection.

Consequently, when the removable medium is removed from a personal computer and loaded into a playback device, the playback device may not be able to read a file storing corresponding additional data from the removable medium, resulting in not being able to generate a virtual package.

Also, a user may desire to listen to more than one BD-ROM, and therefore the playback device may have loaded therein various BD-ROMs. In such cases, if a personal computer provides a file storing additional data with an abbreviated file name and directory name for its own convenience, stores the file in a removable medium, and supplies the file to the playback device, it becomes almost impossible to construct a virtual package correctly, since it is unclear which read-only recording medium corresponds to the file in the removable medium.

An object of the present invention is therefore to provide a playback device that constructs a virtual package by correctly using a file recorded on a removable medium, despite a restriction on the number of characters used for a file name and directory name on the removable medium.

Means to Solve the Problems

The above-described object is fulfilled by a playback device for performing a playback process, based on a file recorded on one of (i) a first recording medium having a first file system format and (ii) a second recording medium having a second file system format, the playback device comprising: a search unit operable to, when an application requests to access a second recording medium with use of a file path in the first file system format, search for an accessible file on the second recording medium based on reference information; and a read unit operable to, (i) if the accessible file is found by the search, read the accessible file from the second recording medium, and (ii) if the accessible file is not found by the search, read a file from the first recording medium, wherein the reference information has been recorded on the second recording medium, and indicates a file path in the second file system format that corresponds to the file path in the first file system format, the file path in the first file system format includes a plurality of identifiers for identifying the first recording medium, the second recording medium is a removable medium, and the file path in the second file system format indicated by the reference information includes parts of one of the identifiers, the parts being used to specify the accessible file and obtained by dividing the one of the identifiers into parts that each have a length complying with the second file system format.

Effects of the Invention

As described above, the reference information in the playback device indicates the correspondence between (i) the file path of the removable medium that is the second recording medium and (ii) the file path of the first recording medium. Therefore, even if the directory name and the file name on the removable medium are each composed of eight characters or less, it is possible to read correct additional data from the removable medium, by accessing a file on the removable medium by referring to the reference information.

A first recording medium corresponding to a file recorded on the removable medium is determined by referring to a file path on the removable medium. Therefore, even if a plurality of first recording media are loaded into the playback device, it is possible to put a restriction on a file access in a manner that the file access in reference to the reference information is only possible if the first recording medium corresponding to the file on the removable medium has been loaded in the playback device.

Assume that the playback device is provided with a removable medium including a file that has a shorten name and a shorten directory name, the name and the directory name being provided by a personal computer. Even in such a case, the playback device can construct a virtual package by correctly determining a first recording medium that corresponds to the file on the removable medium. Also, it is possible to put a restriction on the construction of a virtual package in a manner that the virtual package is constructed only when the playback device has loaded therein the first recording medium corresponding to the file on the removable medium. This enables the virtual package to be more widely used.

Note that characters described in the present specification refer to ASCII characters where the bit length of one character is four bits. ASCII code is a code system for a computer, where 128 types of alphabetical characters, numeric characters, and symbols are each represented by 7 bits. Therefore, a file name and a directory name are each composed of eight characters (=32 bits/4 bits) or less, and an extension is composed of three characters (=12 bits/4 bits) or less.

In a case of adopting JIS code or the like, where the number of bits is not four, a filename and a directory name on the removable medium each have a predetermined number of characters or less. This predetermined number of characters is obtained by dividing 32 bits by the bit length of one character.

As an option, it is possible to add the following inventive feature to the playback device mentioned above, so as to produce a further effect.

The file system format of the removable recording medium may be an 8.3 format in which each of a directory name and a file name is composed of eight characters or less and an extension of a file name is composed of three characters or less.

With the stated structure, even if the file system of the removable medium is a so-called "FAT file system" where there is a strict restriction on a directory name and a file name, it is possible to execute an alias file access that uses a file path of the first recording medium.

It is possible to add the following inventive feature to the playback device mentioned above, to make it more concrete.

The plurality of types of identifiers may be an organization ID and a medium ID, the first recording medium may further include a certificate, the removable medium may include (i) a certificate ID directory corresponding to a certificate ID that is an identifier calculated from the certificate, (ii) an organization ID directory corresponding to the organization ID, and (iii) a medium ID directory set corresponding to the medium ID, the organization ID directory may be located under the certificate ID directory, the medium ID directory set maybe located under the organization ID directory, and may be composed of a plurality of subdirectories that have a hierarchy structure where each of the subdirectories is specified by a respective one of parts of the medium ID, and the reference information and the accessible file on the second recording medium may be located in one of the subdirectories that is in a lowest layer.

Assume here that authentication is realized with use of the certificate identifier, organization identifier, and medium identifier that are provided for the first recording medium, when a virtual package is constructed. Even in such a case, a file is recorded onto the removable medium by strictly corresponding to these identifiers. Therefore, even if a user has a large number of first recording media, and often changes from one recording medium to another among the first recording media, a virtual package is constructed by realizing the alias file access that uses the file path of the first recording medium only when a correct first recording medium has been loaded to the playback device.

It is possible to add the following inventive feature to the playback device mentioned above, to make it more concrete.

The medium ID directory set maybe hierarchized into four subdirectories, the medium ID for the first recording medium may be a character string composed of up to 32 characters, and each of the subdirectories constituting the medium ID directory set may be provided with a directory name composed of 8 characters or less, the directory name being obtained by dividing the character string into four character strings.

Even if the bit length of the medium identifier unique to the first recording medium is long, the medium identifier of the first recording medium is associated with the directory on the removable medium, without omitting meaningful characters among the characters constituting the identifier. Thus, the directory on the removable medium is strictly associated with the medium identifier of the first recording medium.

It is possible to add the following inventive feature to the playback device mentioned above, to make it more concrete.

At least one of upper digits of the medium ID maybe zero, and at least one of the subdirectories may be provided with a directory name composed of number zeros, the application may output, to the read unit, a file path in a format in which the number zeros are omitted, and instruct the read unit to acquire the reference information, and the read unit may convert the file path in the format in which the number zeros are omitted, into a file path of the removable recording medium, and acquire the reference information based on the converted file path.

With the stated structure, the application can access the directory set corresponding to the medium identifier unique to the medium, by using the file path in the format where the number zeros in the upper digits are omitted. Therefore, it is possible to perform an I/O process in a simple manner.

Also, it is possible to add the following inventive feature to the playback device mentioned above, to make it more concrete.

The file path of the first recording medium may be represented with use of a directory name and a file name that are each composed of 255 characters or less.

With the stated structure, the application can execute the alias file access that uses the file path of the first recording medium, with use of the file name composed of 255 characters or less and the directory name composed of 255 characters or less. Therefore, the application can access the file on the removable medium, with use of the same file path that is used when operating on the platform of a personal computer.

Also, it is possible to add the following inventive feature to the playback device mentioned above, to make it more concrete.

The search performed by the search unit may include a process of receiving, from the application, the file path in the first file system format, and judging whether a file path of the removable medium that corresponds to the file path in the first file system format has been written in the reference information, and when the accessible file is not found in the reference information, the read unit may read, from the first recording medium, a file whose location is specified by the file path in the first file system format.

An alias file access that uses the file path of the removable medium is executed when the search is performed to determine whether the file path of the first recording medium received from the application exists on the reference information and the corresponding file path of the removable medium exists in the reference information. The alias file access that uses the file path of the first recording medium is executed based on the premise that the file path of the first recording medium is found in the reference information. Therefore, if the reference information that the search is based on is replaced with different reference information, a different file is read from the removable medium even though the same file path of the first recording medium is used. As described above, even though the same file path of the first recording medium that is issued from the application is used, it is possible to read a different file by replacing the reference information with different reference information. This makes it possible to easily perform control for determining which file on the removable medium is to be read by the application, based on the description in the reference information.

BRIEF DESCRIPTION OF THE DRAWING

FIG. 3 shows the layer model of software targeted by the BD-ROM in Embodiment 1;

FIG. 6 shows the internal structure of an SD memory card that is a removable medium;

FIG. 8 shows an assumed state where the file "00001.m2t" is divided into five parts based on a cluster size, and the divided parts are stored into clusters 503 to 505, 50A, and 50C, respectively;

FIG. 9 shows how the directory entries and FAT are set when the files 00001.m2t are recorded in a plurality of clusters;

FIG. 12 shows a detailed structure of a BD-J module in Embodiment 1;

FIG. 24 shows a state in which the BD-ROM is being played back with use of a removable medium in Embodiment 3;

FIG. 31 is an example of a screen display when the removable medium is removed during playback in Embodiment 3.

DESCRIPTION OF CHARACTERS

Figure 1:
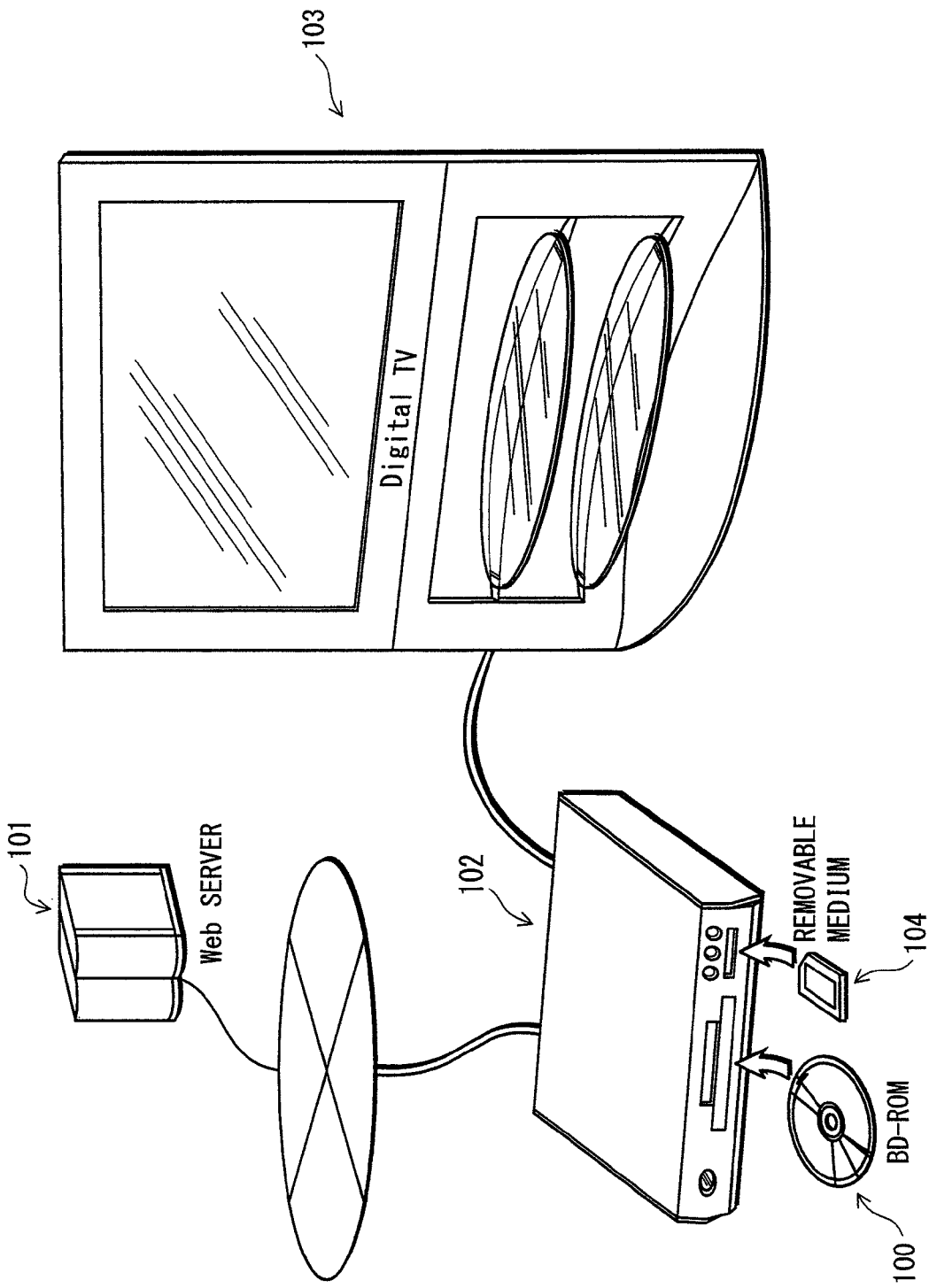
FIG. 1 is a system diagram of Embodiment 1.

100 BD-ROM
101 WWW server
102 playback device
103 television
104 removable medium
1 BD drive
2 track buffer
3 demultiplexer
4 video decoder
5 video plane
5 audio decoder
7 graphics memory
8 graphics plane
9 graphics decoder
10 adder
11 static scenario memory
12 dynamic scenario memory
13 HDMV module 14 BD-J module
15 UO detection module
16 mode management module
17 dispatcher
18 rendering engine
20 AV playback library
21 network interface
22 Built-In medium
23 virtual file system
31 Java(™) application
32 media playback module
39 virtual file system management module
34 file I/O module
35 network module
36 application manager
37 Disc ID confirmation module
38 removable medium detection module
40 DiscID directory conversion unit

BEST MODE FOR CARRYING OUT THE INVENTION (Embodiment 1)

The following describes an embodiment of the present invention with reference to the attached drawings.

Provided below is an embodiment of a playback device. First, among the implementation forms of the playback device according to the present invention, a use form is described. FIG. 1 shows the use form of a playback device 102. As shown in FIG. 1, the playback device 102 is provided for use by a user together with a BD-ROM 100 that is an example of a first recording medium, a WWW server 101, a television 103, and a removable medium 104 that is an example of a second recording medium.

The BD-ROM 100 is a recording medium on which a movie work is recorded.

The WWW server 101 is a server device that manages the official site of the distributor of the movie work, and supplies, to a user, content (additional content) that realizes a partial replacement or addition of the movie work recorded on the BD-ROM 100, via the Internet.

The playback device 102 constitutes a home theater system together with the television 103, and plays back the BD-ROM 100.

The television 103 displays the playback video of the movie work, the menu, etc., thereby providing the user with an interactive operation environment.

The removable medium 104 is mounted in the playback device so as to be used as a storage for storing the content distributed by the WWW server 101 which is the distributor of the movie work. This makes it possible to expand/update the content recorded on the BD-ROM 100, by combining the content of the BD-ROM 100 with the content that is downloaded via the Internet and stored in the removable medium 104. The playback device 102 has an insertion slot for inserting the removable medium 104, which is an SD memory card, a memory stick, a Compact Flash(™), a SmartMedia, a MultiMedia card or the like.

The above describes the use form of the playback device according to the present invention. The following describes a recording medium that is targeted for playback by the playback device according to the present invention. Here, the recording medium targeted for the playback is the BD-ROM 100, which is an optical recording medium.

Figure 2:
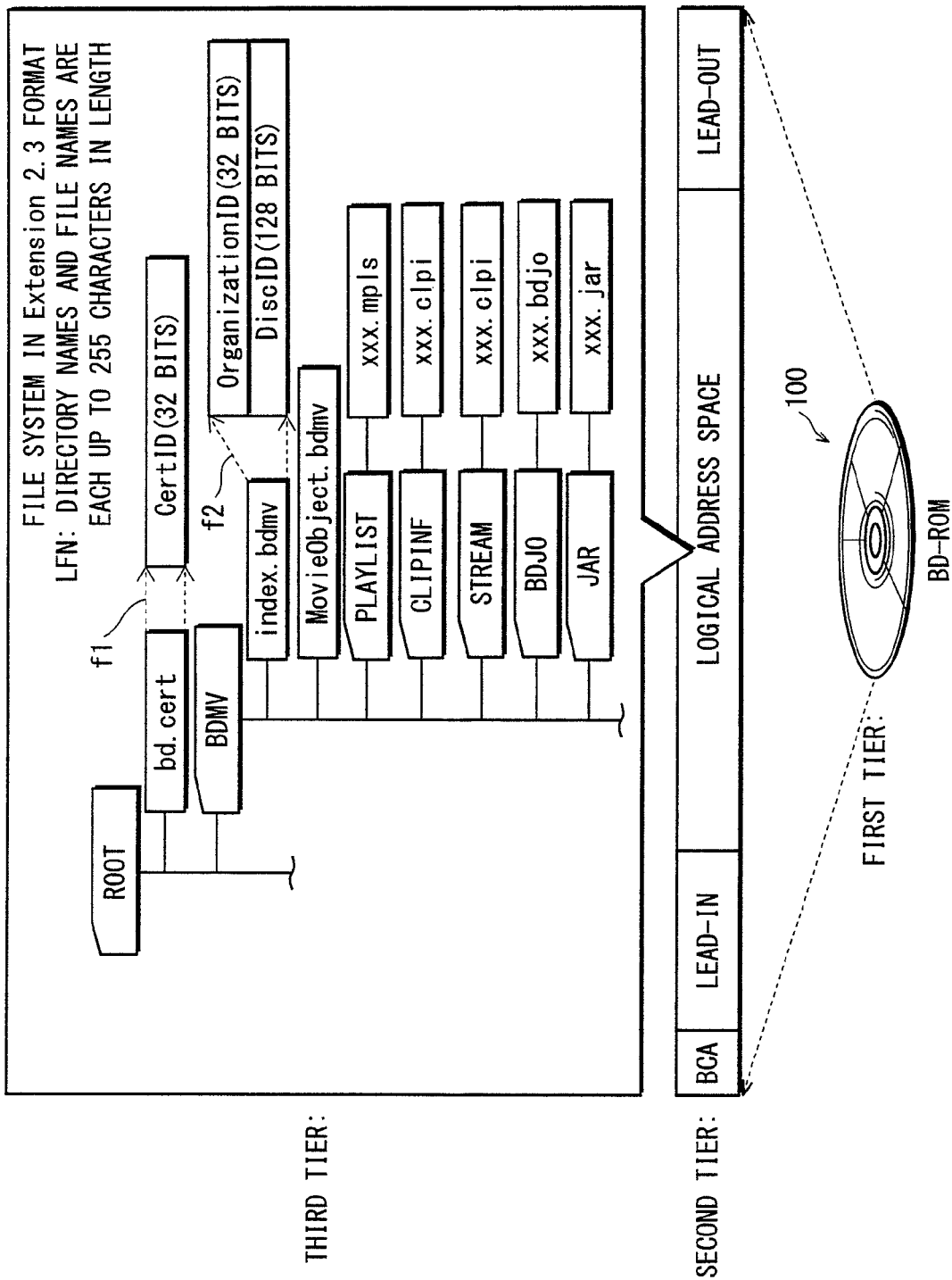
FIG. 2 shows the internal structure of a BD-ROM in Embodiment 1.

FIG. 2 shows the structure of the BD-ROM (hereinafter, also referred to as "BD"). In FIG. 2, the first tier shows the BD-ROM 100, and the second tier shows a storage region.

The storage region is formed spirally from the inner periphery of the BD-ROM 100 to the outer periphery thereof. However, in FIG. 2, the storage region is shown in a straight form by being extended in the horizontal direction. As shown in the second tier, the storage region has a "lead-in" along the inner periphery, a "lead-out" along the outer periphery, and a "logical address space". Also, The inner side of the "lead-in" has a special region called a BCA (Burst Cutting Area), which can be only read by a drive. Since the BCA cannot be read by applications, the BCA is used for copyright protection technologies and the like.

The "logical address space" stores various pieces of video data, starting from region management information for a file system. The "file system" refers to a UDF, an ISO 9660, or the like. In the present embodiment, the file system is in an Extension 2.3 format. This file system enables data recorded in the logical address space to be read with use of a directory and file structure. The location of a file in this file system is specified by the path information (referred to as "file path") of the file that is composed of a directory name and a file name. Each of the directory name and the file name is composed of 255 characters or less.

The third tier in FIG. 2 shows a directory structure and a file structure that are constructed based on the file system in the second tier. FIG. 2 shows a bd.cert file and a BDMV directory immediately under the root directory (ROOT) of the BD-ROM.

The bd.cert (fixed file name) is a certificate (hereinafter referred to as "merge certificate") used for a signature verification performed when content added for a virtual package is merged with the data on the BD-ROM. The merge certificate is used for the authentication of a file (merge management information file) that stores merge management information on the BD-ROM and includes a public key publicized by a provider. The file format of the merge certificate may be, for example, X.509. A detailed specification of X.509 is described in CCITT Recommendation X.509 (1988), "The Directory—Authentication Framework" issued by the International Telegraph and Telephone Consultative Committee. The lead line f1 in FIG. 2 indicates the use of the bd.cert file. As shown by the lead line f1, the bd.cert file is used to derive an ID (referred to as CertID) unique to the certificate.

The BDMV directory stores data including the AV content and management information of the BD-ROM. There are five subdirectories that exist under the BDMV directory, namely a "PLAYLIST directory", a "CLIPINF directory", a "STREAM directory", a "BDJO directory", and a "JAR directory". Also, there are two types of files that exist under the BDMV directory, namely index.bdmv, and MovieObject.bdmv.

The STREAM directory contains files that form a so-called main digital stream. Each of the files is provided with the extension "M2TS" (xxx.m2ts, where "xxx" is variable and the extension "m2ts" is fixed).

The PLAYLIST directory contains files that are each provided with the extension "mpls" (xxx.mpls, where "xxx" is variable and the extension "m2ts" is fixed).

The CLIPINF directory contains files that are each provided with the extension "clpi" (xxx.clpi, where "xxx" is variable and the extension "clpi" is fixed).

The JAR directory contains files that are each provided with the extension "jar" (xxx.jar, where "xxx" is variable and the extension "jar" is fixed).

The BDJO directory contains files that are each provided with the extension "bdjo" (xxx.bdjo, where "xxx" is variable and the extension "bdjo" is fixed).

<Files Provided with Extension "m2ts">

The files provided with the extension "m2ts" are digital AV streams in the MPEG-TS (TransportStream) format, and are each obtained by multiplexing a video stream, one or more audio streams, and one or more graphics streams. The video stream indicates part of moving images of the movie, the one or more audio streams indicate part of audio of the movie, and the one or more graphics streams indicate part of subtitles of the movie.

The files provided with the extension "clpi" are pieces of management information that are in one-to-one correspondence with the digital AV streams. Being the management information, Clip information includes information such as the encoding format, frame rate, bit rate, resolution of the digital AV streams, and EP map indicating the starting position of a GOP.

<Files Provided with Extension "mpls">

Each of the files provided with the extension "mpls" stores PlayList information. The playList information includes MainPath information, SubPath information, and mark information.

1) The MainPath information defines a logical playback section by defining one or more combinations of In_Time and Out_Time, which are time points on the playback time axis of an AV stream. The MainPath information has a stream number table that specifies which elementary stream among the elementary streams multiplexed in the AV stream is to be validated for playback, and specifies which elementary stream in the AV stream is permitted to be played back and which elementary stream in the AV stream is not permitted to be played back.

2) The mark information includes the specification of a time point at which a chapter starts, in a part of the AV stream specified by a combination of start time information and end time information.

3) The SubPath information includes the specification of an elementary stream that is to be played back in synchronization with the AV stream, and a combination of the start time information and the end time information on the playback time axis of the elementary stream. AV playback is started by a Java(™) application instructing a Java(™) virtual machine to generate a JMF player instance that plays back the PlayList information. The JMF player instance is actual data that is generated in a heap memory of the virtual machine based on a JMF player class.

A combination of an AV stream and PlayList information constitutes a unit of playback called "title". The AV playback of the BD-ROM is performed by the unit of title.

<Files Provided with Extension "Jar">

The files provided with the extension "jar" are Java(™) archive files. Each of the files contains the class file of a Java(™) application that performs a dynamic scenario control with use of the Java(™) virtual machine. Each of the Java(™) applications defined by the class files is Java(™) Xlet that is controlled via an Xlet interface. The Xlet interface has four states, namely "loaded", "paused", "active", and "destroyed". The applications described in the present specification refer to the instances of class files recorded on a recording medium such as a BD-ROM.

<Files Provided with Extension "bdjo">

Each of the files provided with the extension "bdjo" stores a BD-J object, which is information that defines a title by associating an AV stream indicated by the PlayList information and an application. Each of the BD-J objects shows an "application management table" and a list of PlayLists that are able to be played back in a corresponding title. Each of the application management tables (AMT) realizes "application signaling", which is a control for the activation and termination of an application by managing a "title" on the BD-ROM as the life cycle of the application. Here, the life cycle indicates a cycle during which an application exists in the heap memory of the virtual machine, on the time axis of the whole content recorded on the BD-ROM. The "exist" refers to a state where the application has been read into the heap memory, and thus executable by the virtual machine. Each of the application management tables indicates an application whose life cycle is a corresponding title, by showing an identifier (application ID) of the application and IDs of Java(™) archive files that belong to the application. In other words, one application includes one or more Java(™) archive files.

<index.bdmv (fixed file name)>

The index.bdmv (fixed file name) is management information related to the BD-ROM as a whole. The index.bdmv is read first after a disc is inserted into the playback device, which enables the disc to be uniquely recognized by the playback device. Furthermore, the index.bdmv includes a table that indicates a plurality of playable titles on the BD-ROM in association with BD-J objects that specify the plurality of playable titles. The lead line f2 in FIG. 2 shows a close-up of the internal structure of the index.bdmv. As shown by this lead line f2, the index.bdmv has information such as an organization ID (32 bits) and a disc ID (128 bits). The organization ID is an identifier that specifies the provider of the movie work, and the DiscID is an identifier that is uniquely assigned to a BD-ROM provided by the provider.

The MovieObject.bdmv (fixed file name) includes a scenario program in which a scenario is written, the scenario being for dynamically changing the proceeding of playback of each title in an HDMV mode (described below).

FIG. 3 shows a layer model of playback control. In FIG. 3, the first layer is a physical layer that controls supply of the main body of a stream targeted to be processed. As shown in the first layer, the supply sources of the stream targeted to be processed include not only the BD-ROM but also various recording media and communication media such as a Built-In medium, a removable medium, and a network. Here, the Built-In medium is a recording medium that has been incorporated in the playback device in advance, such as an HDD (Hard Disk Drive). On the other hand, the removable medium is a portable recording medium such as an SD memory card, a memory stick, a Compact Flash(™), a SmartMedia, and a MultiMedia card. The Built-In medium and removable medium are recording media that are locally used by the playback device, and are collectively referred to as "local storages". The first layer controls (the control being disc access, card access, and network communication) the supply resources such as the local storages and the network.

The second layer is a layer of AV data. The second layer specifies a decoding method used for the decoding of the stream supplied from the first layer.

The third layer (BD management data) is a layer that specifies a static scenario of the stream. The static scenario is playback path information and stream management information that have been specified in advance by the maker of the disc. The third layer specifies playback control based on the playback path information and the stream management information.

The fourth layer (BD playback program) is a layer that realizes a dynamic scenario in the stream. The dynamic scenario is a program that executes at least one of the playback procedure of the AV stream and the control procedure related to the playback. The playback control by the dynamic scenario changes in accordance with a user operation with respect to the playback device, and has a program-like characteristic. The dynamic playback control discussed here has two modes, namely (i) a mode (HDMV mode) for playing back moving image data recorded on the BD-ROM, in a playback environment specific to an AV device, and (ii) a mode (BD-J mode) that enhances the added value of the moving image data recorded on the BD-ROM. The fourth layer in FIG. 3 has a description of two modes, namely the HDMV mode and the BD-J mode. The HDMV mode is a playback mode in a DVD-like playback environment. A scenario program, in which a scenario for dynamically changing the proceeding of playback is written, operates in the HDMV mode. The BD-J mode is a playback mode that is based on the Java(™) virtual machine, where a playback control is performed according to a Java(™) application.

Figure 4A:
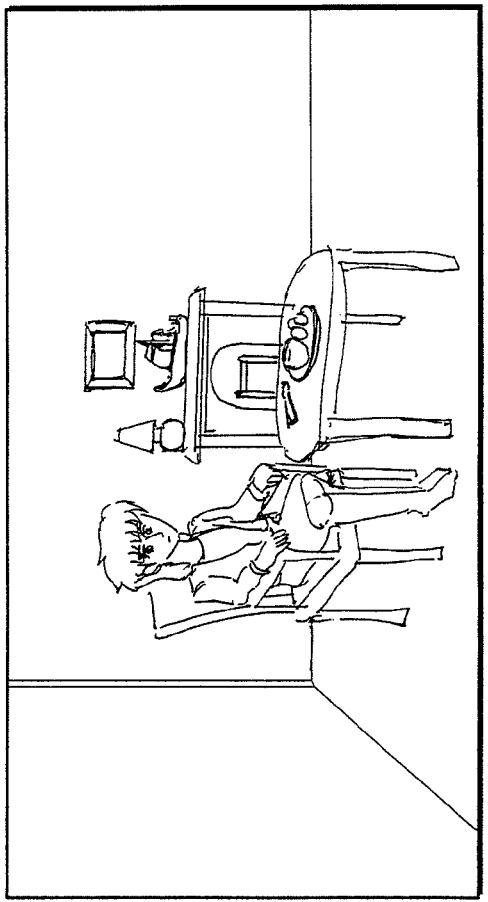
FIGS. 4A and 4B show a movie work created by the dynamic playback control in two modes in Embodiment 1.
Figure 4B:
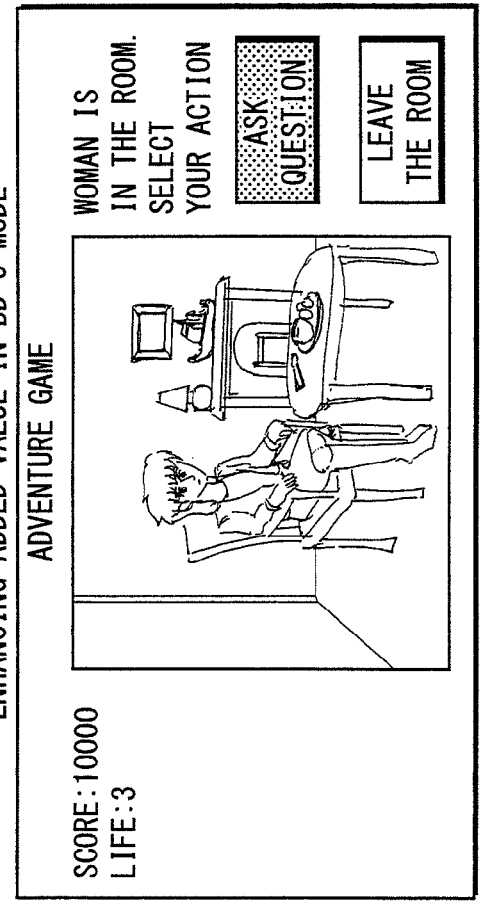

Each of the FIGS. 4A and 4B shows a movie work created with use of the dynamic playback control having two modes. FIG. 4A shows one scene of the movie work created by defining the dynamic playback control in the HDMV mode. In the HDMV mode, it is possible to write the playback control by using a command similar to a command interpretable by a DVD playback device, which makes it possible to define a playback control similar to a playback control used in the DVD playback device, namely a playback control in which playback is progressed by a selection made on the menu.

FIG. 4B shows one scene of the movie work created by defining the dynamic playback control in the BD-J mode. In the BD-J mode, it is possible to write a control procedure in a Java(™) language interpretable by the Java(™) virtual machine. Assume that this playback control constitutes the GUI of an adventure game. In this case, it is possible to provide a user with a composite image in the BD-J mode, where the composite image is composed of, for example, a moving image, the score of the game (SCORE: 10000 in FIG. 4B), an indicator (LIFE: 3), and buttons (Ask Question and Leave the Room).

This concludes the description of the BD-ROM 100. The following provides a detailed description of the playback device 102.

Figure 5:
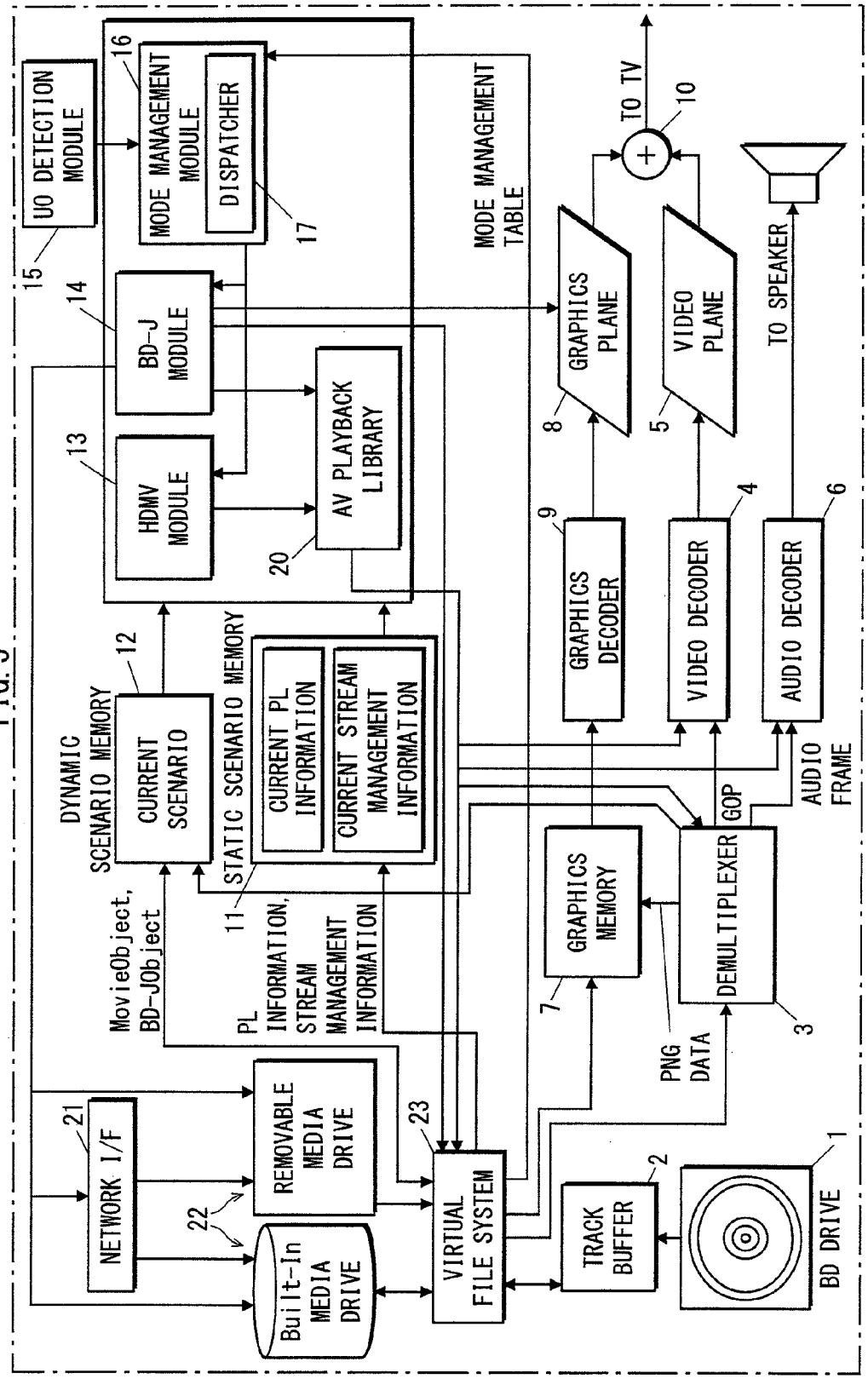
FIG. 5 shows the internal structure of a playback device in Embodiment 1.

FIG. 5 is a block diagram that schematically shows the functional structure of the playback device 102. As shown in FIG. 5, the playback device 102 includes a BD drive 1, a track buffer 2, a demultiplexer 3, a video decoder 4, a video plane 5, an audio decoder 6, a graphics plane 8, a graphics decoder 9, an adder 10, a static scenario memory 11, a dynamic scenario memory 12, an HDMV module 13, a BD-J module 14, a UO detection module 15, a mode management module 16, a dispatcher 17, an AV playback library 20, a network interface 21, a removable media drive/Built-In media drive 22, and a virtual file system 23. The hardware and software of the present playback device are controlled via Linux, which is the operating system of the present playback device.

The BD drive 1 loads/ejects the BD-ROM, thereby accessing the BD-ROM. The operating system of the present BD-ROM playback device is Linux. Therefore, a BDAV directory is allocated to the BD drive 1 by issuing the command "/mount point BD/BDAV".

The track buffer 2 is an FIFO memory in which ACCESS UNITs that have been read from the BD-ROM are stored in first- in first-out order.

The demultiplexer 3 demultiplexes transport streams that are stored on the BD-ROM loaded in the BD-drive 1 or the removable media drive/Built-In drive 22, thereby obtaining video frames that constitute a GOP, and audio frames. Then, the demultiplexer 3 outputs the video frames to the video decoder 4, and outputs the audio frames to the audio decoder 6. The demultiplexer 3 stores a graphics stream in the graphics memory 7. The demultiplexing performed by the demultiplexer 3 includes a conversion process for converting a TS packet into a PES packet.

The video decoder 4 decodes the video frames output from the demultiplexer 3, and writes uncompressed pictures onto the video plane 5.

The video plane 5 is a memory for storing the uncompressed pictures.

The audio decoder 6 decodes the audio frames output from the demultiplexer 3, and outputs uncompressed audio data.

The graphics memory 7 is a buffer for storing the graphics stream read from the demultiplexer 3 or an image file read from either the BD-ROM or the removable media drive/Built-In media drive 22 via the virtual file system 23.

The graphics plane 8 is a memory that has a region for one screen, where an expanded graphics stream is arranged.

The graphics decoder 9 expands the graphics stream stored in the graphics memory 7, and writes the expanded graphics stream onto the graphics plane 8. Decoding of the graphics stream allows various types of menus and graphics to appear on a screen.

The adder 10 superimposes the expanded image on the graphics plane 8, on the uncompressed picture data stored on the video plane 5, and outputs the superimposed image. The superimposed image shown in FIG. 4B is output by the adder 10 superimposing the graphics on the graphics plane 8, on the picture on the video plane 5.

The static scenario memory 11 is a memory for storing a current PL and current stream management information. The current PL is a piece of PlayList information that is currently targeted to be processed, among a plurality of pieces of PlayList information stored on the BD-ROM or the removable media drive/Built-In media drive 22. The current stream management information is a piece of Clip information that is currently targeted to be processed, among a plurality of pieces of Clip information recorded on the BD-ROM or the removable media drive/Built-In media drive 22.

The dynamic scenario memory 12 is a memory for storing a current dynamic scenario that is to be provided for a process performed by the HDMV module 13 and the BD-J module 14. The current dynamic scenario is a Movie object or a BD-J object that is targeted to be processed, among the Movie objects and BD-J objects recorded on the BD-ROM or the removable media drive/Built-In media drive 22.

The HDMV module 13 is a DVD virtual player that is mainly responsible for executing processes in the HDMV mode, and executes the current scenario program read into the dynamic scenario memory 12.

The BD-J module 14 is a Java(™) platform, and includes a Java(™) virtual machine, a configuration, and a profile. The BD-J module 14 generates a current Java(™) object from a Java(™) class file read into the dynamic scenario memory 12, and executes the current Java(™) object. The Java(™) virtual machine converts a Java(™) object written in the Java(™) language into the native code of a CPU in the playback device, so as to cause the CPU to execute the converted Java(™) object written in the native code.

The UO detection module 15 detects a user operation performed with respect to an input device such as a remote controller or a front panel of the playback device, and notifies the mode management module 16 of the user operation. This notification process is performed by generating a UO (User Operation) in accordance with an interrupt generated by an interrupt handler in a device driver corresponding to the input device, and outputting the UO to the mode management module 16. The UO is an event (UO event) generated when the pressing of a key is detected by a key matrix provided on the remote controller or the front panel, and includes a key code corresponding to the key that has been pressed. Specifically, a UO event is generated by generating an interrupt signal based on the pressing of a key, when the interrupt handler of the device driver corresponding to the remote controller or the front panel has detected that the key has been pressed, with use of a key sense for the key matrix.

The mode management module 16 holds Index.bdmv that has been read from the BD-ROM or the removable media drive/Built-In media drive 22, and performs a mode management and a branch control. The mode management by the mode management module 16 is a module allocation, where a determination is made as to whether the dynamic scenario is to be executed by the HDMV module 13 or the BD-J module 14.

The dispatcher 17 selects, from UOs, only UOs appropriate for the current mode of the playback device, and passes the appropriate UOs to a module that executes the current mode. For example, upon receipt of UOs such as Up, Down, Left and Right, and Activate operations during the HDMV mode, the dispatcher 17 outputs these UOs to a module in the HDMV mode.

The AV playback library 20 performs an AV playback function and a PlayList playback function, in accordance with a function call from the HDMV module 13 and BD-J module 14. The AV playback function is a function group succeeded from a DVD player and a CD player, and includes processes such as playback start, playback stop, pause, release of pause, release of still image function, fast-forward at a playback speed specified by an immediate value, fast-reverse at a playback speed specified by an immediate value, audio switch, subtitle switch, and angle switch. The PlayList playback function refers to a function that performs, among these AV playback functions, the playback start and the playback stop based on the PlayList information.

The network interface 21 executes a protocol stack for a network connection, and causes the playback device to recognize a drive included in a server computer on the network, as a network drive. This makes it possible for the network interface 21 to download and upload data via the network drive. The network interface 21 is used for downloading BD-ROM additional content which is publicized on the Internet. The BD-ROM additional content is content not included in the original BD-ROM, such as additional sub-audio, additional subtitles, bonus images, and applications. The BD-J module 14 controls the network interface 21, so as to download the additional content publicized on the Internet onto the Built-In media drive or the removable medium 104.

The Built-In media drive/removable media drive 22 stores downloaded additional content, data to be used by applications, and the like. The storage region of the additional content is divided for each BD-ROM, and the region used by the applications to store data is divided for each application. The removable media drive/Built-In media drive 22 also stores merge management information on which a merge rule is written. The merge rule indicates how to merge downloaded additional content with the data on the BD-ROM.

In the present embodiment, the BUDA directory for storing an additional content data file is allocated to the removable medium 104 mounted in the removable media drive. Since the operation system of the present BD-ROM playback device is Linux, the BUDA directory is allocated to the removable medium 104 by issuing the command "/mount point SD/BUDA". The Built-In medium is used as a recording region for recorded images.

The virtual file system 23 constructs a virtual BD-ROM (virtual package) that is obtained by merging additional content stored on either one of the Built-In medium and the removable medium, with the content on the BD-ROM, based on the merge management information downloaded onto the removable media drive/Built-In media drive 22 together with the additional content. Both of the HDMV module 13 and the BD-J module 14 can refer to the virtual package and the original BD-ROM in the same manner. During the playback of the virtual package, the playback device performs a playback control with use of the data on the BD-ROM and data on either one of the Built-In medium and the removable medium. This concludes the description of the components of the playback device.

In the present embodiment, an SD memory card is adopted as a removable medium for storing an additional content data file.

The SD memory card is a card-type recording medium having the size of a stamp, where the length is 32.0 mm, the width is 24.0 mm, and the thickness is 2.1 mm. A user can hold this SD memory card with his/her fingertips. The SD memory card is provided with nine connectors to be connected to the playback device. The SD memory card has a protect switch on the side, which allows the user to set whether to permit or prohibit overwriting of the storage content. The SD memory card includes a "nonvolatile memory", an "access control unit", and a "workmemory". The volatile memory is a NAND-type EEPROM. The access control unit writes data into the nonvolatile memory, reads data from the nonvolatile memory, and deletes data stored in the nonvolatile memory, in accordance with commands issued by the playback device. The work memory temporarily stores data read from the nonvolatile memory when the data is rewritten.

The SD memory card is formatted using either FAT 16 or FAT 32. In the FAT 16, an entry length of 16 bits is allocated to each cluster, and a 2-Gbyte recording region is targeted for access In the FAT 32, an entry length of 32 bits is allocated to each cluster, and a 32-Gbyte recording region is targeted for access. An SD memory card formatted using the FAT 32 is especially referred to as an "SDHC memory card".

The following describes this removable medium. FIG. 6 shows the internal structure of the SD memory card that is the removable medium. The left part of FIG. 6 shows the SD memory card, and the middle part of FIG. 6 shows the internal structure of a recording region that complies with a FAT file system. This recording region is composed of a "Master Boot Record", a "Partition Table", a "system region" and a "user region".

The "Master Boot Record" is an indicator that causes the playback device to recognize that regions following the "Master Boot Record" are "one physical medium". In FIG. 6, only one "Master Boot Record" exists in the recording region, and therefore the playback device recognizes only one physical medium in the recording region. However, if two Master Boot Records are provided in the recording region, the playback device recognizes two physical media.

The "Partition Table" is a table in which information related to partition is written.

The "system region" stores a "partition boot sector", a "redundant FAT", and a "Root directory entry".

The "user region" is a region in which files are stored in clusters that are each a minimum unit, and stores a "BUDA directory entry", a "CertID directory entry", an "OrganizationID directory entry", a "DiscID directory entry", a "merge management information file", a "signature information file", and an "additional content data file".

The following describes the redundant FAT.

Figure 7A:
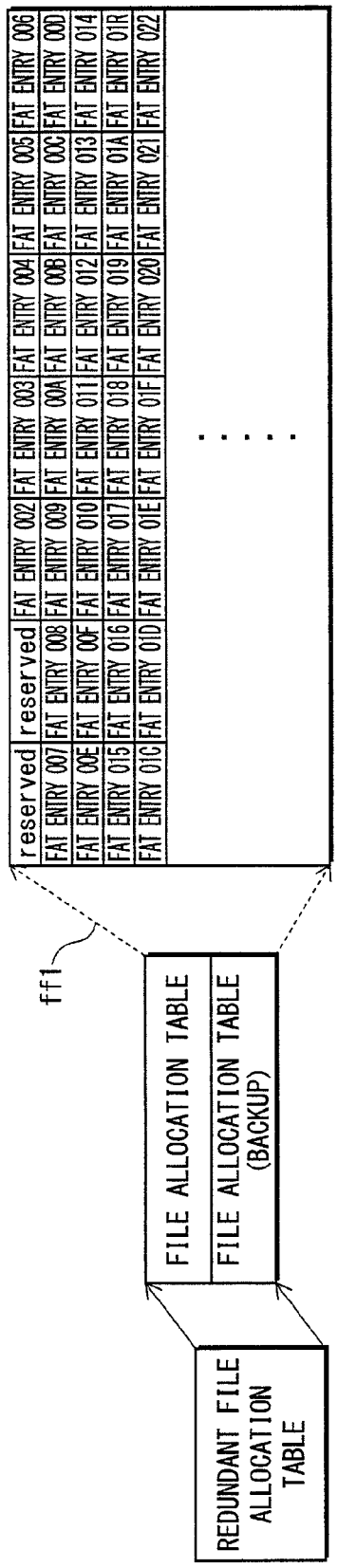
FIG. 7A shows the internal structure of a redundant FAT.

The "redundant FAT (File Allocation Table)" is composed of two FATs that comply with the ISO/IEC 9293 Standard. FIG. 7A shows the internal structure of the redundant FAT. Each of the FATs is composed of a plurality of FAT entries that are in one-to-one correspondence with a plurality of clusters. Each of the FAT entries shows whether or not a corresponding cluster is in use. When a cluster is not in use, "0" is set in a corresponding FAT entry of the cluster. When a cluster is in use, a cluster number is set in the corresponding FAT entry. The cluster number shows a link relationship between clusters. For example, the cluster number shows which cluster is to be read next after the corresponding cluster is read. A broken lead line ff1 in FIG. 7A shows a plurality of FAT entries included in the FAT, namely 002, 003, 004, 005 . . . . The numerical values "002, 003, 004, 005 . . . " that are provided for the FAT entries show the clusters corresponding to the FAT entries. In other words, the numerical values show the cluster numbers of the clusters corresponding to the FAT entries.

Figure 7B:
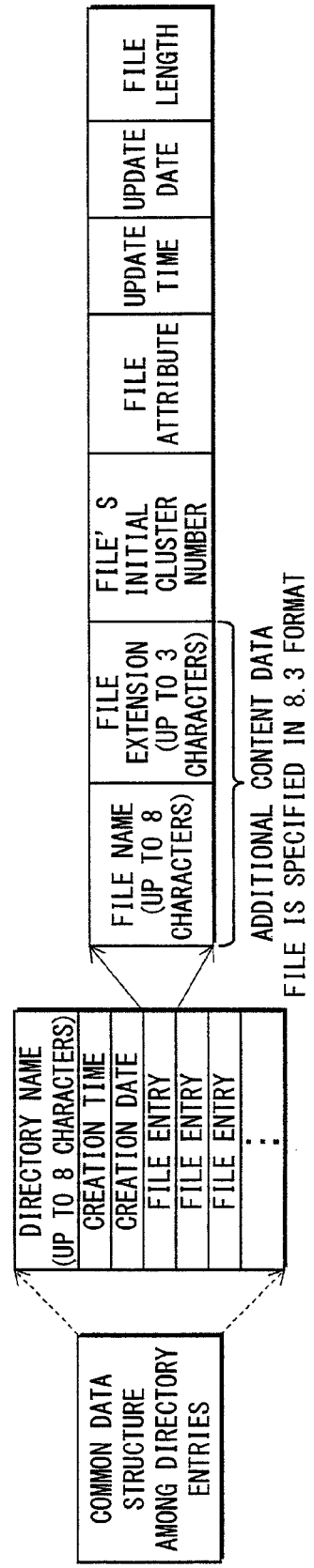
FIG. 7B shows a common data structure of directory entries.

The following describes directory entries. The directory entries include the "Root directory entry" that exists in the system region, and the "BUDA directory entry", "CertID directory entry", "OrganizationID directory entry", and "DiscID directory entry" that exist in the user region. Each of these directories has a common data structure shown in FIG. 7B. As shown in FIG. 7B, each of the "directory entries" includes a "directory name" that is composed of up to eight ASCII characters, "creation time", a "creation date", and "file entries" for files existing in each of the directories. Each of the file entries includes a "file name" that is composed of up to eight ASCII characters, a "file extension" that is composed of up to three ASCII characters, "file's initial cluster number" that stores the initial part of the file, a "file attribute" that is the attribute of the file, "update time" at which the file was updated, an "update date" that is a date on which the file was updated, and a "file length" that is the data length of the file.

The directory names and file names in the SD memory card are written in the directory entries described above. In principle, the Root directory entry in the directory entries needs to be arranged in one cluster, together with the redundant FAT, so that the Root directory entry and the redundant FAT are collectively managed. Therefore, it is not realistic for the directory names and the file names to be long. Specifically, the number of characters for each of the directory names and the file names is restricted to up to eight ASCII characters, and the number of characters for the extensions is restricted to up to three characters. A file system format in which the directory names and the file names are restricted in length in the above-described manner is called "8.3 format".

The following describes how the FAT and directory entries are set when an additional content data file is stored in the DiscID directory. The additional content data file described here is a file called "00001.m2t" that stores an AV clip. FIG. 8 shows an assumed state where the file "00001.m2t" is divided into five parts in accordance with a cluster size, and the divided parts are stored into clusters 503, 504, 505, 50A, and 50C, respectively.

The second tier to the seventh tier in FIG. 8 schematically show how an elementary stream indicating video and an elementary stream indicating audio are multiplexed in the AV clip. The AV clip is generated by first converting digitized video and digitized audio (seventh tier) into elementary streams that are each composed of PES packets (sixth tier), then converting the elementary streams into TS packets (fifth tier), and multiplexing the TS packets.

Here, the video stream is composed of a plurality of pictures, as shown in the seventh tier in FIG. 8, and a relationship between these pictures and Access Units is represented as 1 Access Unit=1 picture. The audio stream is composed of a plurality of audio frames, and a relationship between the audio frames and Access Units is represented as 1 audio frame=1 Access Unit. In the BD-ROM, there is a restriction represented as 1 PES packet=1 frame. In other words, when moving images have a frame structure, 1 PES packet=1 picture, and when the moving images have a field structure, 1 PES packet=2 pictures. In view of these matters, the PES packets shown in the seventh tier of FIG. 8 store the pictures and audio frames in the seventh tier in a one-to-one ratio.

The AV clip described above includes an "STC Sequence" as shown in the fourth tier. The "STC Sequence" is a section that is on the time axis of MPEG2-TS that shows decoding time and display time, and that does not include any system time-base discontinuity points of System Time Clock (STC) which is the system reference time of the AV stream. The system time-base discontinuity points of the STC are points at which a discontinuity_indicator of a PCR packet is on. Here, the PCR packet is a packet that carries PCR (Program Clock Reference), which is referred to by a decoder to acquire the STC.

The third tier to the first tier shows a process in which the TS packets constituting the AV clip are written onto the BD-ROM. The first tier in FIG. 8 shows the TS packets constituting the AV clip.

Each of the TS packets that constitute the AV clip is 188 bytes in size, and becomes a Source packet having a length of 192 bytes when a TS_extra_header (hatched part in FIG. 8) of 4 bytes is attached thereto. Each TS_extra_header includes an Arrival_Time_Stamp that is information indicating the time at which a corresponding TS packet is input to the decoder.

The Source packets constituting the AV clip include one or more "ATC_Sequences" shown in the third tier. Each of the "ATC Sequences" is a string of Source packets that constitute the time axis of an ATS written in the AV clip, and has no arrival time-base discontinuity point in an Arrival_Time_Clock that is being referred to by a corresponding Arrival_Time_Stamp. In other words, an "ATC_Sequence" is a string of Source packets in which the Arrival_Time_Clock that is being referred to by the Arrival_Time_Stamp has continuity. Each ATS is provided at the initial part of a TS packet, and indicates time at which the TS packet is transferred to the decoder.

The above-described ATC_Sequences constitute the AV clip and are recorded onto the BD-ROM, with a filename called "00001.m2t" as shown in the second tier.

The AV clip is divided into parts that are each the size of cluster, in the same manner as a normal computer file. Then, the divided parts are recorded into a region on the BD-ROM. The first tier schematically shows how the AV clip is recorded onto the removable medium 104. As described above, the minimum access unit for the data region is a cluster. Therefore, the file "00001.m2t" needs to be stored in the data region, with a cluster size being a minimum unit. This means that the file "00001.m2t" is divided into parts that are each the size of cluster and then the divided parts are stored in clusters.

When the file "00001.m2t" is divided to be stored, the directory entry and the FAT need to be set as shown in FIG. 9.

FIG. 9 shows an example of setting the directory entry and the FAT in a case where the file "00001.m2t" is stored in a plurality of clusters. In FIG. 9, in a case where the initial part of the file "00001.m2t" is stored in the cluster 503, a cluster number 503, which is the number of a cluster that stores the initial part of the file "00001.m2t", is written in the "file's initial cluster number" in the DiscID directory entry. It can be seen in FIG. 9 that subsequent parts of the file "00001.m2t" are stored in the clusters 504 and 505. The cluster 503 that stores the initial part of the file "00001.m2t" corresponds to a FAT entry 503 (504). This FAT entry 503 (504) shows the cluster 504 that stores a second part of the file "00001.m2t" that is subsequent to the initial part thereof. The clusters 504 and 505 store parts that are subsequent to the second part of the file "00001.m2t", and correspond to a FAT entry 504 (505) and a FAT entry 505 (50A), respectively. The FAT entries 504 (505) and 505 (50A) show the clusters 505 and 50A, respectively. The clusters 505 and 50A store parts of the file "00001.m2t" that are subsequent to the second part thereof. As described above, the AV clip stored on the removable medium 104 is read by tracing (i) the file's initial cluster number in the DiscID directory entry and (ii) the FAT entries, so as to be provided for playback.

The following describes directories that are constructed based on the file system described above.

Figure 10:
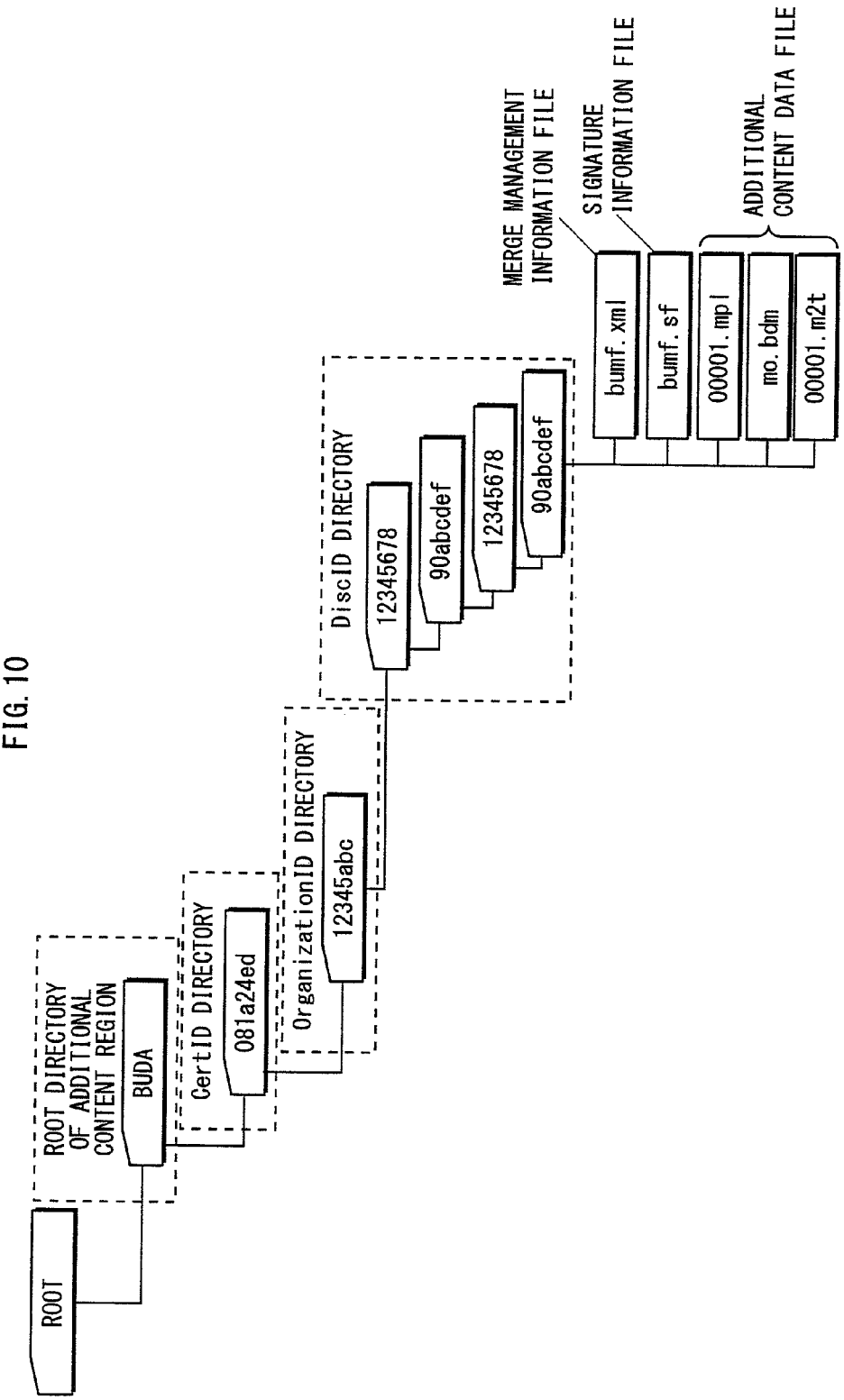
FIG. 10 shows the directory structure of the removable medium in Embodiment 1.

FIG. 10 shows the structure of the directories on the removable medium. The removable medium includes a BUDA directory that is the root directory of an additional content region, a CertID directory, an Organization ID directory, and a Disc ID directory. The Disc ID directory includes a merge management information file "bumf.xml", a signature information file "bumf.sf", and additional content data files "00001.mpl", "mo.bdm", and "00001.m2t".

The root directory of the additional content region (BUDA directory) is located immediately under the root directory of the removable medium, and shows the root of the additional content region. The directory name of this BUDA directory is a fixed value (BD_BUDA) that is composed of up to eight characters.

The "CertID directory" is a directory whose name is an ID derived from a merge certificate (bd.cert) on the BD-ROM. The name of the "CertID directory" is composed of eight characters in hexadecimal notation that represents the first 32 bits of a 160-bit SHA-1 digest value of the merge certificate.

The "OrganizationID directory" is a directory whose name is composed of eight characters in hexadecimal notation that represents a 32-bit identifier (Organization ID). The organization ID specifies the provider of the movie work, and is written in the BD management information (index.bdmv) on the BD-ROM.

The "DiscID directory" is composed of four layers of subdirectories. Each of the four layers of subdirectories is provided with a directory name that is composed of up to eight characters. Each of the subdirectories is allocated a name composed of eight characters in hexadecimal notation. Each of the names is obtained by dividing a 128-bit identifier (DiscID) that specifies the BD-ROM into four 32-bit parts from the beginning. Since being written in the BD management information (index.bdmv) on the BD-ROM, the Disc ID can be obtained by opening the "index.bdmv". For example, four directory names in FIG. 10, namely "12345678", "90abcdef", "12345678", and "90abcdef" are obtained by dividing a DiscID "1234567890abcdef1234567890abcdef" that is composed of 32 characters (128 bits) by eight characters (32 bits) from the least significant bit. Since the Disc ID is associated with the 8.3 format without omitting meaningful characters among the characters constituting the Disc ID, the four layers of subdirectories strictly correspond to the Disc ID.

There are three files under the DiscID directory, namely a "merge management information file", a "signature information file", and an "additional content data file". These files form the core of the generation of the virtual package. The following describes the content of each of these files in detail.

The "merge management information file" is information showing a correspondence between (i) the file path of an additional content data file on the removable medium and (ii) a file path for an alias access on the virtual package. The merge management information file is stored into the DiscID directory with a file name called "bumf.xml". The merge management information file is characterized in that the directory names and file names on the removable medium comply with the 8.3 format, since the merge management information file is based on the file path on the removable medium, namely the FAT file system. In this way, the file path complying with the 8.3 format corresponds to the file path of the LFN in the virtual package. The file path of the virtual package complies with the directory structure of the BD-ROM, because the virtual package handles the files on the removable medium in the same manner as the files stored on the BD-ROM. The file system format of the BD-ROM corresponds to the LFN. Therefore, although being in the 8.3 format, the additional content data files on the removable medium are accessed with an alias that uses a file name composed of up to 255 characters, by referring to the merge management information file. The merge management information file realizes an "alias access" with respect to various files recorded in the 8.3 format, with use of file names that are each composed of up to 255 characters.

Figures 11A, 11B:
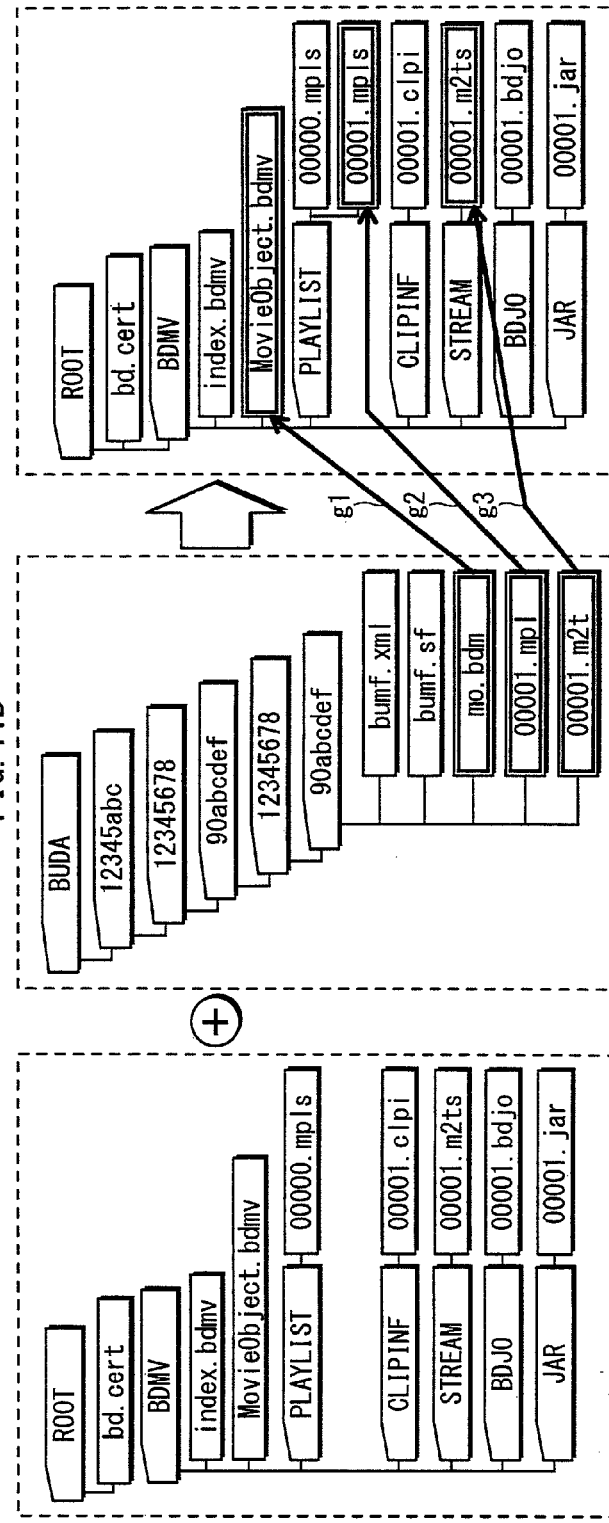
FIGS. 11A and 11B show a virtual package in Embodiment 1.

FIG. 11A shows the internal structure of the merge management information. The merge management information in FIG. 11A shows, for each of the three additional contents: 00001.mpl, mo.bdm, and 00001.m2t, a correspondence between a file path on the removable medium and a file path on the virtual package. The file paths on the removable medium comply with the 8.3 format.

The following specifically explains a description of each file path in FIG. 11A. A file path called "12345abc/12345678/90abcdef/12345678/90abcdef/00001.mpl" that is in the 8.3 format on the removable medium corresponds to a file path called "BDMV/PLAYLIST/00001.mpls" that is in the LFN format on the virtual package. This example complies with FIG. 10, and shows paths from the CertID directory to the additional content data files.

A file path called "12345abc/12345678/90abcdef/12345678/90abcdef/mo.bdm" that is in the 8.3 format on the removable medium corresponds to a file path called "BDMV/MovieObject.bdmv" that is in the LFN format on the virtual package.

A file path called "12345abc/12345678/90abcdef/12345678/90abcdef/00001.m2t" that is in the 8.3 format on the removable medium corresponds to a file path called "BDMV/STREAM/00001.m2t" that is in the LFN format on the virtual package.

FIG. 11B shows a process in which the content on the BD-ROM is merged with the additional content on the removable medium, based on the merge management information.

In FIG. 11B, the left part shows the content stored on the BD-ROM, the middle part shows the content stored on the removable medium, and the right part shows the content stored on the virtual package. The merge management information file is set as shown in FIG. 11A. Therefore, among the data stored on removable medium, three content data files that exist in the "12345abc/12345678/90abcdef/12345678/90abcdef" under the BUDA directory, namely "mo.bdm", "00001.mpl", and "00001.m2t" are respectively combined with the directory structure of the virtual package written in the merge management information file, as shown by the arrows g1, g2, and g3. To combine a file on the removable medium with the directory structure written in the merge management information file in the above-described manner is referred to as "merge".

After merged in the above-described manner, the "mo.bdm" becomes accessible with an alias file name called "MovieObject.bdmv" that exists in the BDMV directory.

Also, the "00001.mpl" becomes accessible with an alias file name called "00001.mpls" that exists in the PLAYLIST directory under the BDMV directory.

Furthermore, the "00001.m2t" becomes accessible with an alias file name called "00001.m2ts" that exists in the STREAM directory under the BDMV directory.

Since an alias name access as described above is possible, the "mo.bdm", "00001.mpl", and "00001.m2t" can be handled as existing in the "BDMV/MovieObject bdmv", "BDMV/PLAYLIST/00001.mpls", and "BDMV/STREAM/00001.m2ts", under the BDMV directory, respectively.

The "signature information file" shows the electronic signature of the provider with respect to the merge management information file, and is stored in the DiscID directory with a file name called "bumf.sf". Generally, the electronic signature is generated by calculating a hash value with respect to information necessary to be protected from tampering, and encrypting the calculated hash value with use of a private key. Specifically, the information necessary to be protected includes, for example, the file name of an additional content data file, and the file path of the additional content data file when recording the additional content data file onto the Built-In medium. The file path is in the LFN format and written in the merge management information file. Therefore, the hash value is calculated for the file path written in the merge management information file. Also, in the signature information file of the present invention, the hash value of the merge management information file is encrypted with use of a private key that corresponds to a public key in the merge certificate on the BD-ROM.

The "additional content data files" are files that realize addition/update, with respect to the original content recorded on the BD-ROM. Each of the additional content data files is recorded onto the removable medium with a file name in the 8.3 format (the filename being composed of up to eight characters, and the extension being composed of up to three characters). As described above, the DiscID directory is converted without omitting any of the characters, so that all the characters of the DiscID directory are shown as the directory name. However, the file name of each additional content data file is abbreviated by using some of the characters of the file name. Here, the file name of an additional content data file is originally a file name on the BD-ROM, and is limited to several patterns of "five-digit numerical value+one of several kinds of extensions". Therefore, it is highly unlikely that any inconvenience such as confusion occurs, even though some of the characters constituting the file name are omitted.

Among the three additional content data files shown in FIG. 10, the "00001.mpl" stores PlayList information, the "mo.bdm" stores a Movie object, and the "00001.m2t" stores an AV clip. It is possible to select files other than the stated files from among the files that are to be recorded onto the BD-ROM, and set the selected files to be the files targeted to be the additional content data files, as long as the selected files can be recorded onto the BD-ROM and provided for a user. For example, it is possible to select, as the files targeted to be the additional content data files, a file storing "index.bdmv" or Clip information (the extension being "clpi"), a Java archive file (the extension being "Jar"), and a file (the extension being "bdjo") storing a BD-J object.

FIG. 12 shows the structure of the BD-J module in FIG. 5 in more detail, and also shows a process of the BD-J module downloading an additional content file from the network to either one of the Built-In medium and the removable medium. The BD-J module 14 is composed of a media playback module 32, a file I/O module 34, a network module 35, an application manager 36, and a virtual file system management module 39. Note that the AV playback library 20, the network I/F 21, the Built-In media drive/removable media drive 22, and the virtual file system 23 in FIG. 12 are the same as those shown in FIG. 5, and are shown for the convenience of a description of the media playback module 32 through the virtual file system management module 39.

The media playback module 32 provides the Java(™) application 31 with an API that is for a media playback control. When the Java(™) application 31 calls the API for the media playback control, the media playback module 32 performs an AV playback control by calling a function of the AV playback library 20 that corresponds to the API.

The file I/O module 34 performs a process for an access request given from the Java(™) application 31 to either one of the Built-In medium and the removable medium.

In a case where the access request is for writing an additional content data file, the Java(™) application 31 can arrange the additional content file in an appropriate position on either one of the Built-In medium and the removable medium, with use of the file I/O module. Also, the Java(™) application 31 can delete unwanted additional content files, and can directly edit additional content files. The file I/O module 34 is also used to access the virtual package. However, it is not permitted to write onto the virtual package via the file I/O module 34, since the access to the virtual package is read-only.

In a case where the access request is for reading an additional content data file, the file I/O module 34 receives a file path in the LFN format for the BD-ROM from the application program 31, and then performs a search to determine whether the removable medium stores a file that is accessible with use of the file path in the LFN format.

This search is performed by judging whether the file path in the LFN format is written as an "alias file path" in the merge management information file.

If the search reveals that the removable medium stores an additional content data file that is accessible with an alias file path in the LFN format, the additional content data file is read from the removable medium, in accordance with the file path in the 8.3 format that is written in the merge management information file. Since performing such a search, a search unit described in the disclosure of the invention corresponds to this file I/O module 34.

In a case where the removable medium does not store any additional content data file that is accessible with an alias file path in the LFN format, an additional content data file that is accessible with the alias file path in the LFN format is read from the BD-ROM. If such an additional content data file does not even exist on the BD-ROM, an error process is performed.

The network module 35 provides the Java(™) application 31 with an API for a network control. Upon receipt of a request for a network connection from the Java(™) application 31, the network module 35 establishes a network connection with use of the network interface 21. The Java(™) application 31 uses the network module 35 to search for a publicized additional content, and to download the publicized additional content on to the Build-In medium/removable medium.

The application manager 36 manages the activation and deactivation of a Java(™) application, based on the application management information recorded on the BD-ROM. Also, the application manager 36 passes a UO event received from the dispatcher 17 to the Java(™) application 31 that is currently in operation.

The DiscID confirmation module 37 confirms the DiscID of a BD-ROM that has been inserted. The value of the DiscID acquired by the DiscID confirmation module 37 is used when the virtual file system 23 constructs a virtual package.

The removable media detection module 38 monitors the insertion and ejection of the removable medium. When the removable medium is either inserted or ejected, the removable media detection module 38 notifies the virtual file system 23 of the insertion or the ejection.

The virtual file system management module 39 receives a virtual package construction/update request from the Java (™) application 31, and transfers the request to the virtual file system 23. In the case of constructing/updating the virtual package, the Java(™) application issues the virtual package construction/update request by specifying a new merge management information file and a new signature information file. Upon receipt of the virtual package construction/update request via the virtual file system management module 39, the virtual file system 23 verifies the signature of the new merge management information file, with use of the new signature information file. Then, the virtual file system 23 reconstructs the virtual package by replacing an old merge management information file and an old signature information file with the new merge management information file and the new signature information file. The replacement of the old merge management information file and the old signature information file is performed when titles are switched. Provided below is an explanation about the titles.

Figure 13:
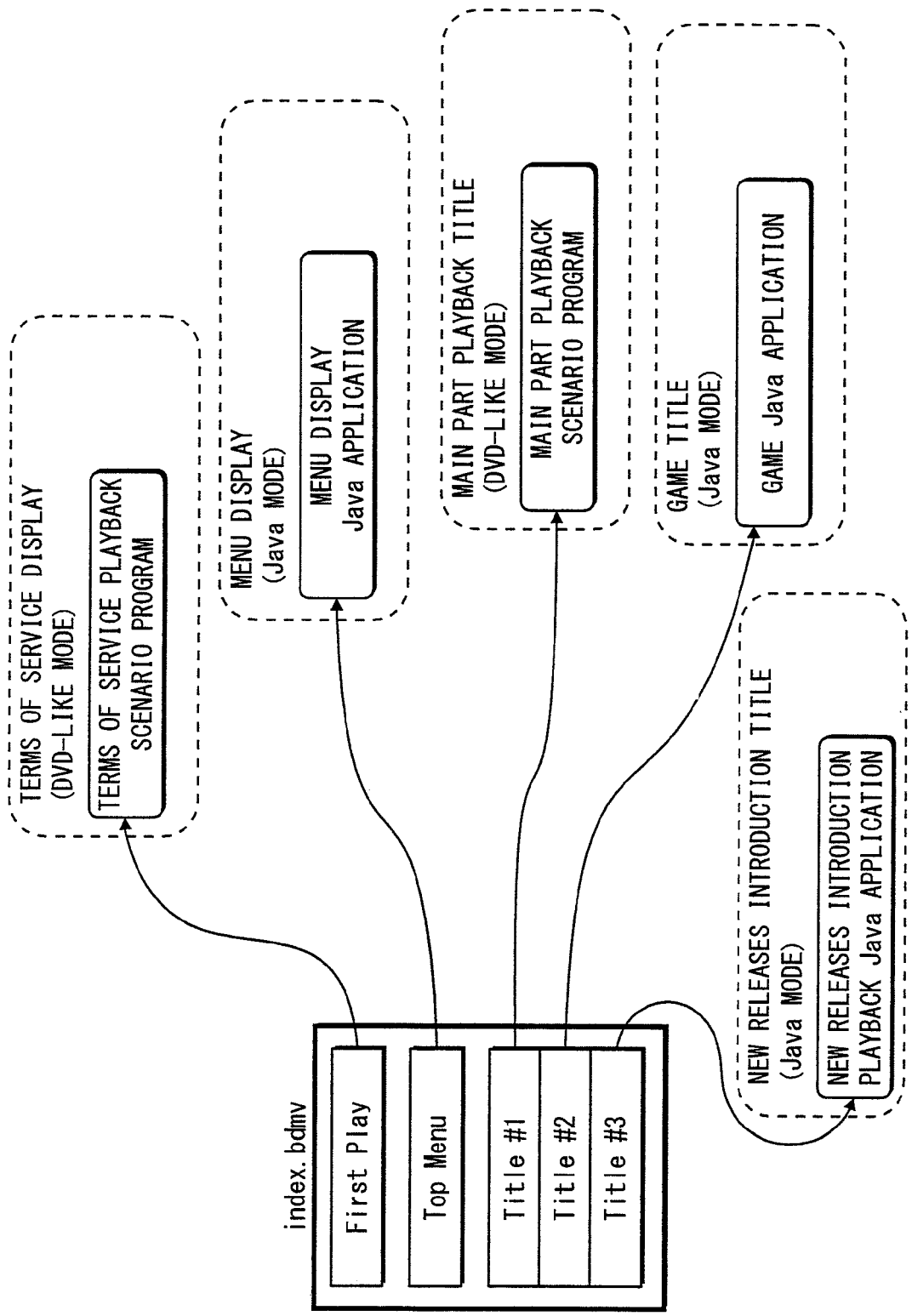
FIG. 13 shows a relationship between the file "index.bdmv" and Titles in Embodiment 1.

FIG. 13 shows a relationship between an index.bdmv file and the titles. The titles are playback units that are each a combination of an application and an AV stream. The index.bdmv file includes a description of the title structure of the disc, thereby managing a reference relationship between each of the titles on the disc and an application corresponding thereto (the corresponding application being a Java(™) application when the title is in the BD-J mode, and a scenario program when the title is in the HDMV mode title). Also, there are special titles called "First Play" and "Top Menu". The "First Play" is a title that is automatically played back at the start of playing back the BD-ROM, and is mainly used to display the terms of service of the BD-ROM. The "Top Menu" is played back when the menu key of the remote controller is pressed or when the title playback ends, and is mainly used to select a title or a language for subtitles/audio. In a case where the content of the index.bdmv file is changed due to the update of the virtual package, the title structure becomes different between before and after the update of the virtual package.

The following describes the process of each component when the BD-ROM is inserted into the playback device.

When the BD-ROM is inserted into the playback device, the Disc ID confirmation module 37 first identifies the CertID directory from the "bd.cert", and then confirms the DiscID and the OrganizationID that are described on the "index.bdmv", and thereby determines the corresponding DiscID directory on the Built-In medium. After confirming that the merge management information file has not been tampered, with use of a signature information file in the DiscID directory corresponding to the inserted BD-ROM, the virtual file system 23 creates a virtual package, by merging the content on the BD-ROM with an additional content file that is stored in the DiscID directory based on the merge management information.

Figure 14:
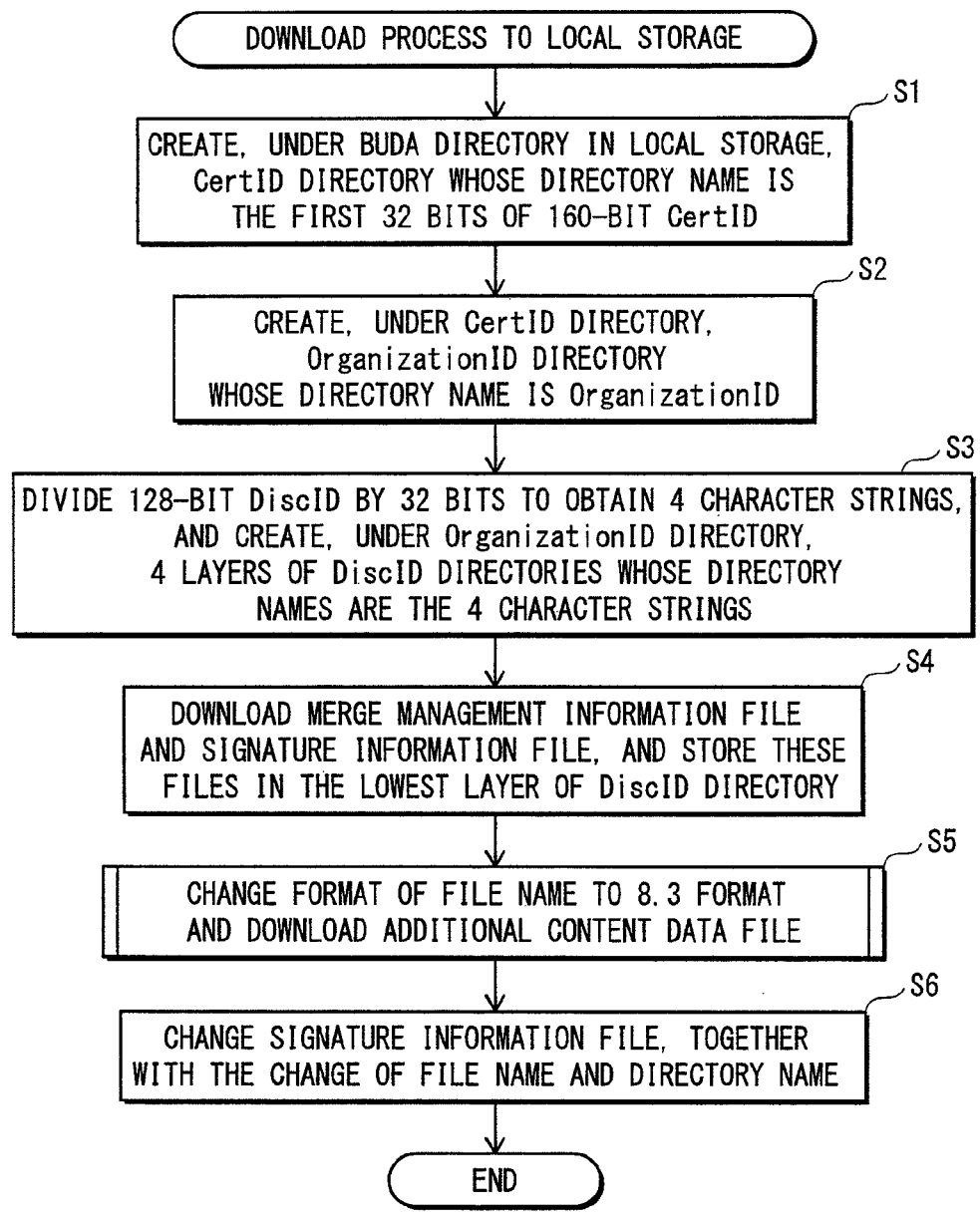
FIG. 14 is a flowchart showing the process steps of downloading data onto the removable medium.

The virtual package is a package that virtually exists. In reality, the virtual package is composed of files stored on either one of the Built-In medium and the removable medium and files stored on the BD-ROM. However, the virtual package causes the HDMV module 13 and the BD-J module 14 in the application layer (the fourth layer shown in FIG. 3) to refer to a file as if all the files were stored on the BD-ROM, and the virtual file system 23 monitors the reference process of the HDMV module 13 and the BD-J module 14. Then, when a path to the file that is being referred to matches the file path of the virtual package written in the merge management information, the virtual file system 23 changes the reference destination of the HDMV module 13 and the BD-J module 14 to a file that is on the Built-In medium and that is written on a file path corresponding to the matching file path. In other words, even if a file stored on the Built-In medium or the removable medium had a file name in the 8.3 format in reality, the HDMV module 13 and the BD-J module 14 in the application layer can handle the file name as a long file name. FIG. 14 is a flowchart showing the process steps of downloading an additional content data file onto the removable medium. First, a CertID directory whose directory name is composed of the first 32 bits of 160 bits representing the CertID is created under the BUDA directory of the removable medium that is the Built-In medium (step S1). Then, an Organization ID directory whose directory name is the Organization ID is created under the CertID directory created in step S1 (step S2). Finally, four layers of subdirectories are created under the Organization ID directory (step S3), where the directory name of each subdirectory is a different one of 32-bit character strings that are obtained by dividing a 128-bit Disc ID into four parts.

After the directory structure for the removable medium is constructed in the above-described process, the merge management information file and the signature information file are downloaded and stored into the lowest layer in the DiscID directory (step S4). Then, an additional content data file is downloaded and the file name thereof is changed to the 8.3 format (step S5). After the additional content data file is downloaded in the above-described manner, the signature information file is changed in accordance with the change of the file name and the directory names in the merge management information file (step S6). The step S6 is performed for the following reasons. That is to say, the provider side calculates a hash value with respect to a file path corresponding to the LFN format in the Built-In medium, which is a file path before the file path is changed, so as to prevent tampering, and then writes the calculated hash value into the signature information file. The playback device changes the format of the file path whose hash value has been calculated, from the LFN format to the 8.3 format. Therefore, in accordance with this change of the format, it is necessary to recalculate the hash value in the signature information file. The recalculation of the hash value following the change of file path is performed in the step S6.

Figure 15:
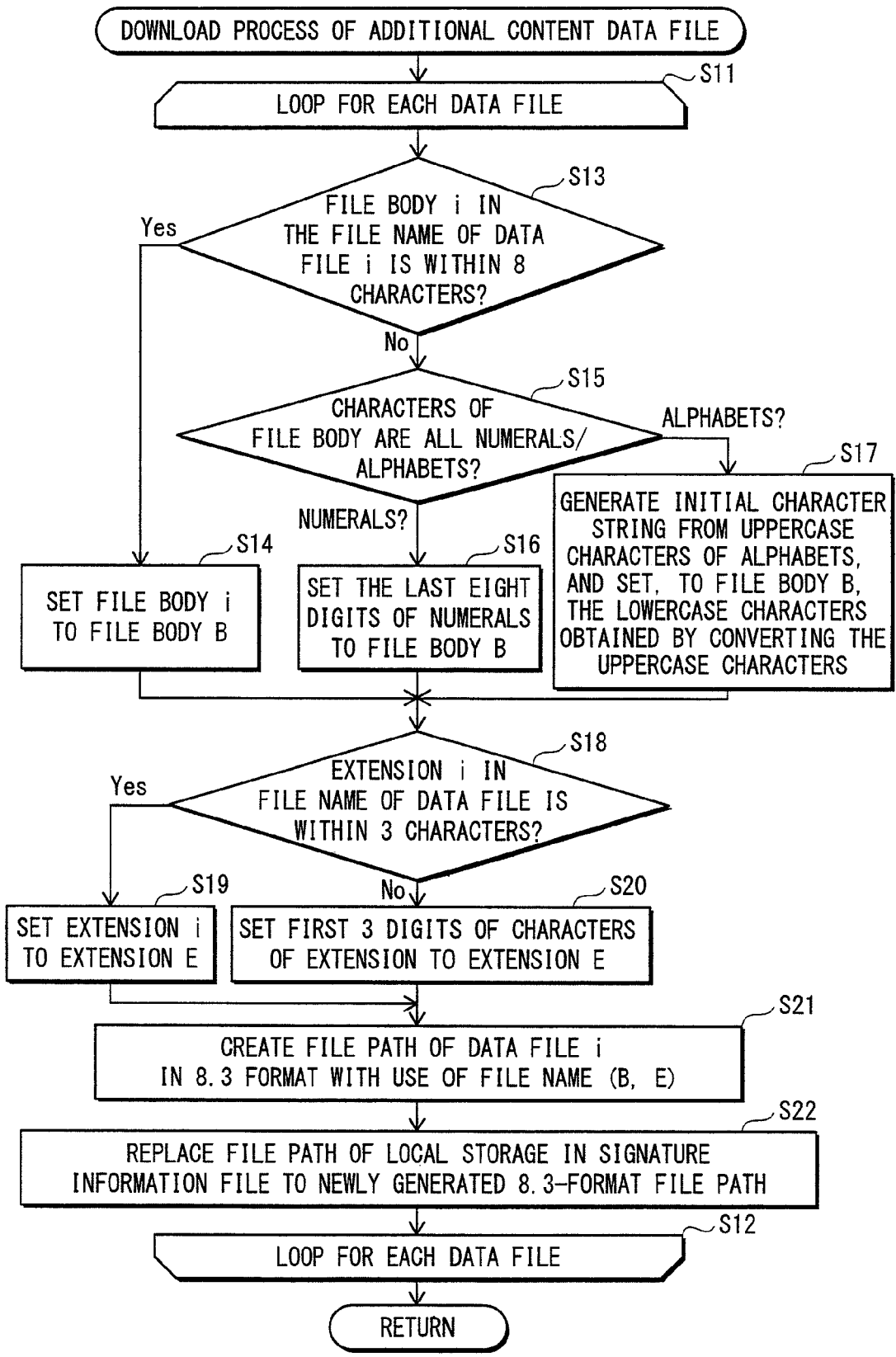
FIG. 15 is a flowchart showing the process steps of downloading an additional content data file.

FIG. 15 is a flow chart showing the process steps of downloading the additional content data files. This flowchart shows a loop structure where the process of step S13 to step S22 is repeated for each additional content data file. Here, an additional content data file targeted to be processed among the plurality of additional content data files is referred to as an additional content data file i.

Also, when recording the additional content data file onto the removable medium, the file body (referring to a part of the character string of a file name, which excludes an extension) of a file name provided for the additional content data file is referred to as "file body B", and the extension of the file name provided for the additional content data file is referred to as "extension E".

Step S13 is a process for judging whether a file body i in the file name of the additional content data file i is composed of eight characters or less. When it is judged that the file body i of the additional content data file i is composed of eight characters or less, the file body i is set to the file body B. When it is judged that the file body i is composed of more than eight characters, step S15 is performed so as to judge whether the characters of the file body i of the additional content data file i are all numerals or alphabets.

When it is judged that the characters are all numerals, the last 8 digits of numerals constituting the file body i of the additional content data file i are set to be the file body B (step S16). When it is judged that the characters are all alphabets, initial characters are generated from uppercase characters of the alphabets in step S17, and the initial characters are converted into lowercase characters so as to set the lowercase characters to the file body B.

Step S18 is a process for judging whether the extension of the file name of the additional content data file i is composed of three characters or less. If it is judged that the extension is composed of three characters or less, the extension of the additional content data file i is set to an extension E (step S19). If it is judged that the extension is composed of more than three characters, the first three digits of the characters of the extension of the additional content data file i are set to the extension E (step S20). After the above-described process, a combination of the file body B and the extension E (shown as "file name (B.E)" in the flowchart of FIG. 15 is used to generate the file path of the additional content data file on the removable medium (step S21), and the file path of the local storage in the merge management information file is replaced with a 8.3-format file name that has been newly generated (step S22).

Figure 16:
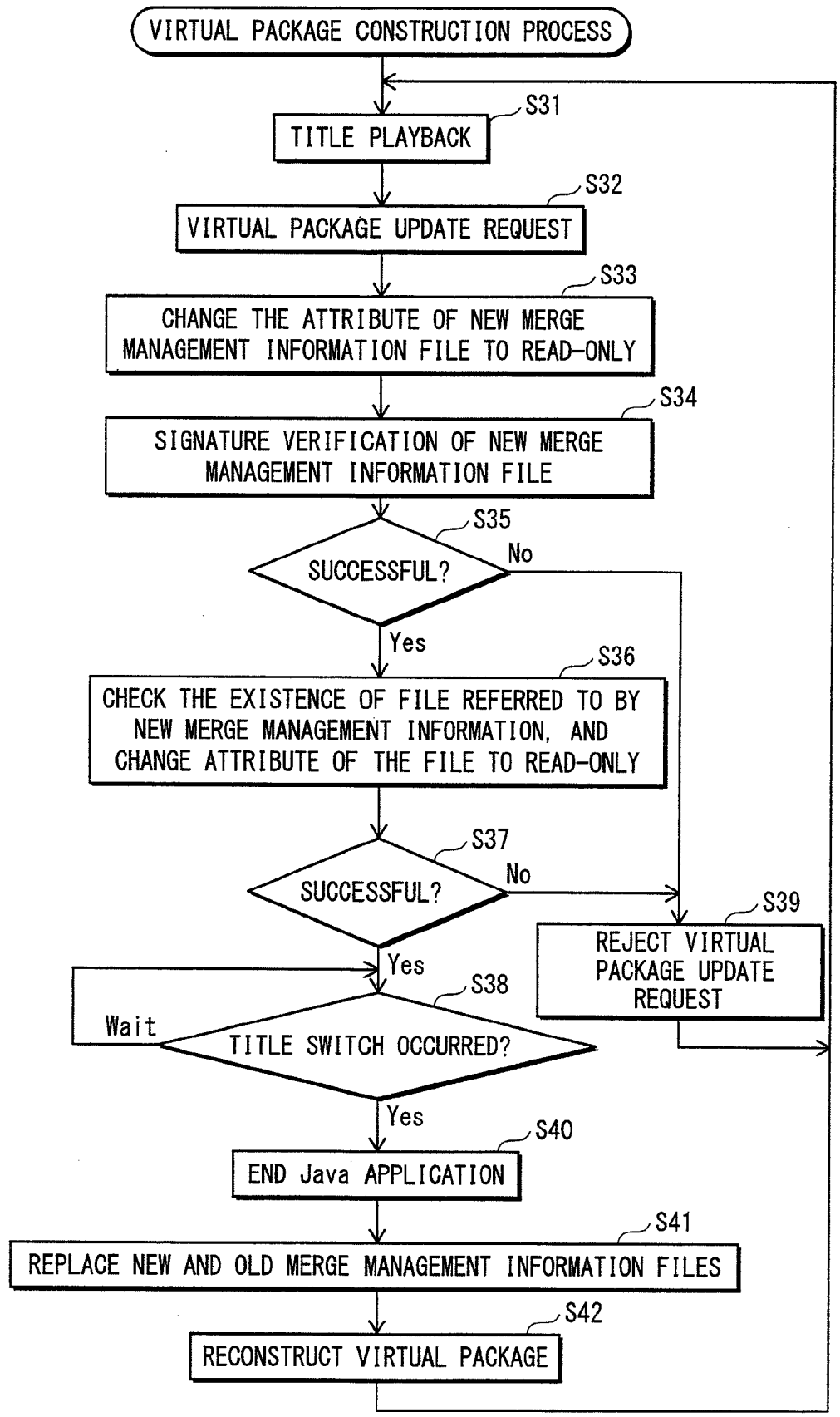
FIG. 16 is a flowchart showing the process steps of constructing the virtual package in Embodiment 1.

FIG. 16 is a flowchart showing the process steps of reconstructing a virtual package by replacing an old merge management information file into a new merge management information file when switching titles. First, a title for the BD-J mode is played back (step S31), and a Java(™) application requests for updating the virtual package during the playback of the title (step S32).

The value of an argument given at the time of the virtual package update request is composed of a file path indicating the position of the new merge management information file and a file path indicating a signature information file corresponding to the new merge management information file.

When the virtual file system 23 receives the virtual package update request, the state of the virtual file system 23 is set to "update in preparation", and the attribute of the new merge management information file that has been specified is changed to read-only, so that the new merge management information file cannot be rewritten (step S33). Then, the signature information file that has been specified at the time of the virtual package update request is used to verify the signature of the new merge management information file (step S34).

When the signature verification in step S34 has failed (No in step S35), the virtual file system 23 stops the virtual package update request, returns the attribute of the new merge management information file from read-only to the original attribute that is an attribute before the virtual package update request was issued, and throws a virtual package update rejection notification event at the Java(™) application (step S39).

When the signature verification in step S34 has been successful (Yes in step S35), the virtual file system 23 checks the existence of files on the Built-In medium/removable medium that are being referred to by the new merge management information file. If such files exist, the virtual file system 23 changes the attributes of the files so as to be only read from the Java(™) application (step S36).

When the files that are being referred to by the new merge management information file and are necessary for constructing the virtual package do not exist on the Built-In medium/removable medium (step S37), the virtual file system 23 stops the virtual package update process, returns the attribute of the file that has been changed in steps S33 and S36 to the original attribute before the virtual package update request, and throws the virtual package update request rejection notification event at the Java(™) application (step S39).

When files that are being referred to by the new merge management information file and that are necessary for constructing the virtual package all exist on the Built-In medium/removable medium, and also the attributes of the files have been changed to read-only from the Java(™) application (Yes in step S37), the virtual file system 23 sets the state of the virtual file system to "update preparation completed", and throws an update preparation completion notification event at the Java(™) application.

After the state of the virtual file system 23 becomes "update preparation completed", an occurrence of a title switch is waited (step S38). When the title switch occurs, the Java(™) application that was running in a title before the title switch is ended (step S40). Subsequently, if the old merge management information file exists, it is overwritten with the new merge management information file, so as to replace the old merge management information file with the new merge management information file (step S41). When the old merge management information file does not exist because the original BD-ROM was played back before the update of the virtual package, the new merge management information file is moved to a position under a DiscID directory that corresponds to the DiscID of the inserted BD-ROM and renamed to the legitimate merge management information file name, instead of overwriting the old merge management information file. Similarly, the replacement and moving of new and old files is performed with respect to the signature information file.

After the replacement of the new and old merge management information files and the replacement of the new and old signature information files, or the moving of the new merge management information file and the moving of the new signature information file have been completed, the virtual package is reconstructed based on the new merge management information file (step S42).

After the virtual package is reconstructed, the read-only attribute is removed from the files on the Built-In medium/removable medium that are referred to by the old merge management information file but not by the new merge management information file, so that the files can be read and written by the Java(™) application. The new merge management information file, and the files on the Built-In medium/removable medium that are being referred to by the new merge management information file continue to have the read-only attribute.

When the reconstruction of the virtual package is completed, the playback of a new title that has been switched to is started with use of the newly constructed virtual package (step S31). A merge management information file corresponding to the virtual package that is being played back, and a file on the Built-In medium/removable medium that is being referred to by this merge management information file always have the read-only attribute while the virtual package is played back, and cannot be edited or deleted by the Java(™) application.

Figure 17:
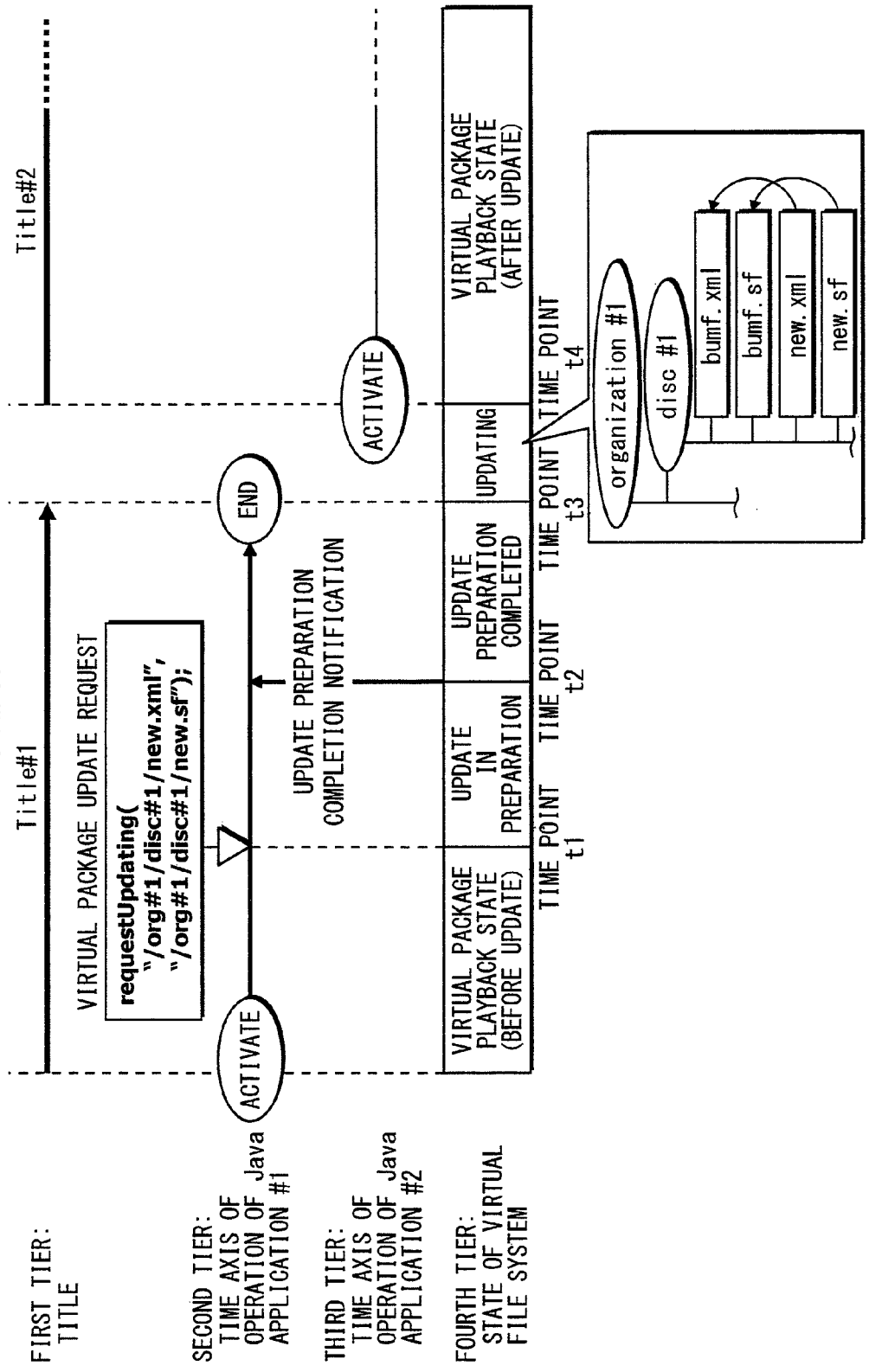
FIG. 17 shows a temporal process flow from when a Java (™) application issues a virtual package construction/update request to when the virtual package is updated.

FIG. 17 shows a temporal process flow from when the Java(™) application issues a virtual package construction/update request to when the virtual package is updated.

In FIG. 17, the first tier shows the time axis of the playback of a title, and the second tier shows the time axis of the operation of an application #1. The third tier shows the time axis of the operation of an application #2, and the fourth tier shows the time axis of the state transition of the virtual file system.

The initial state in FIG. 17 is assumed to be the state where the storing of the new merge management information file and the new signature information file is completed. In other words, the initial state in FIG. 17 is assumed to be a state where a new merge management information file and a new signature information file, separately from the merge management information file and the signature information file that are currently being used for the construction of the virtual package, have been downloaded from a server on the Internet, in addition to additional content, and have been stored onto the Built-In medium or the removable medium.

At a time point t1, which is when a title #1 is being played back, the Java(™) application 31 is assumed to request the virtual file system 23 to construct/update the virtual package, via the API provided by the virtual file system management module 39. The request Updating ("/org#1/disc#1/new.xml", "/org#1/disc#1/new.sf") shown in FIG. 17 is an API call to be this virtual package construction request. The arguments of this virtual package construction request, namely the "/org#1/disc#1/new.xml", "/org#1/disc#1/new.sf" are file paths specifying the positions of the new merge management information file and the new signature information file that have been stored on the Built-In medium/removable medium. The time point t1 indicates a time point when this update request is made.

At the time point t1, the virtual package construction/update request is received from the Java(™) application 31, and the state of the virtual file system is transitioned to "update in preparation".

Here, the "update in preparation" includes a process for changing the attribute of the new merge management information file that has been specified and the attribute of the files on the Built-In medium/removable medium that are being referred to by the new merge management information file, to the read-only attribute.

In addition to the above-described process, the signature verification of the new merge management information file is performed with use of the signature information file specified by the Java(™) application 31 when the virtual package update request was issued. Furthermore, a check is performed to determine whether all the files described in file storage position information of the new merge management information file exist at specified positions.

A time point t2 indicates a time point when the state of the virtual file system is set to "update preparation completed", after the check for determining the existence of the files has been completed. After the state is transitioned in the above-described manner, the update preparation completion notification event is thrown at the Java(™) application. When the signature verification of the new merge management information file or the existence check of the files described in the file storage position information has been failed, the virtual file system 23 rejects the update request, throws the update request rejection notification event at the Java(™) application 31, via the virtual file system management module 39, and returns the state of the virtual file system 23 to a state (either "virtual package playback state" or "BD-ROM playback state") before "update in preparation". Here, the "virtual package playback state" indicates that the BD-ROM has been loaded into the playback device and is being played back as a virtual package by the virtual file system 23, and has no pending virtual package update request. The "BD-ROM playback state" indicates that the BD-ROM has been loaded into the playback device, and is being played back as the original BD-ROM, and has no pending virtual package update request.

A time point t3 indicates a time point when the state of the virtual file system 23 has become "update preparation completed". When a title switch occurs, the virtual file system 23 replaces the old merge management information file (a merge file information file used for the construction of the current virtual package) with the new merge management information file that was specified when the virtual package update request was issued, by overwriting the old merge management information file, with use of the new merge management information file.

When the old merge management information file does not exist because the original BD-ROM was played back before the update of the virtual package, the new merge management information file is moved to a position under a DiscID directory that corresponds to the DiscID of the inserted BD-ROM, instead of overwriting the old merge management information file. In this way, the new merge management information is renamed to the legitimate merge management information file name (bumf.xml). Similarly, the replacement of new and old files is performed with respect to the signature information file. After the replacement of the new and old merge management information files and the replacement of the new and old signature information files, or the moving of the new merge management information file and the moving of the new signature information file have been completed, the virtual file system 23 reconstructs the virtual package based on the new merge management information file stored under the Disc ID directory that corresponds to the DiscID of the inserted BD-ROM, and updates the file structure of the virtual package.

A time point t4 is a time point when the above-described update is completed, and the Built-In media drive/removable media drive 22 enters the "virtual package playback state". Even after the virtual package is updated, the new merge management information file, and the files on the Built-In medium/removable medium that are indicated by the file storage position information of the new merge management information file continue to have the read-only attribute, during the period of the "virtual package playback state". However, the read-only attribute is removed from the files that are referred to by the old merge management information file but not by the new merge management information file, resulting in the files being read and written by the Java(™) application.

As described above, according to the present embodiment, it is possible to construct a virtual package with use of a removable medium, even in a playback device whose file system only supports a file name in the 8.3 format with respect to the removable medium. Also, it is possible to maintain compatibility between playback devices, by fixing the root directory of the additional content region in the removable medium. Specifically, even if additional content data is recorded onto a removable medium by a playback device, and then the removable medium is mounted in an other playback device, the other playback device can use the additional content data recorded on the removable medium.

Note that in step S17 in FIG. 15, the LFN format is changed to the 8.3 format by generating the initial characters of the alphabets. However, another generation method may be adopted in accordance with a targeted filename. For example, the LFN format is changed to the 8.3 format by extracting the first eight characters of the targeted file name.

(Embodiment 2)

The present embodiment is related to the handling of "0"s in the upper digits of the DiscID. An application that operates on an MHP (multimedia Home Platform) omits "0"s in the upper digits of an ID unique to the MHP when the ID is used. As for the DiscID, it is also preferable to omit "0"s in the upper digits. Therefore, the Java(™) application in the present embodiment uses the DiscID whose "0"s in the upper digits are omitted, in order to give instructions to construct a virtual package.

Figure 18:
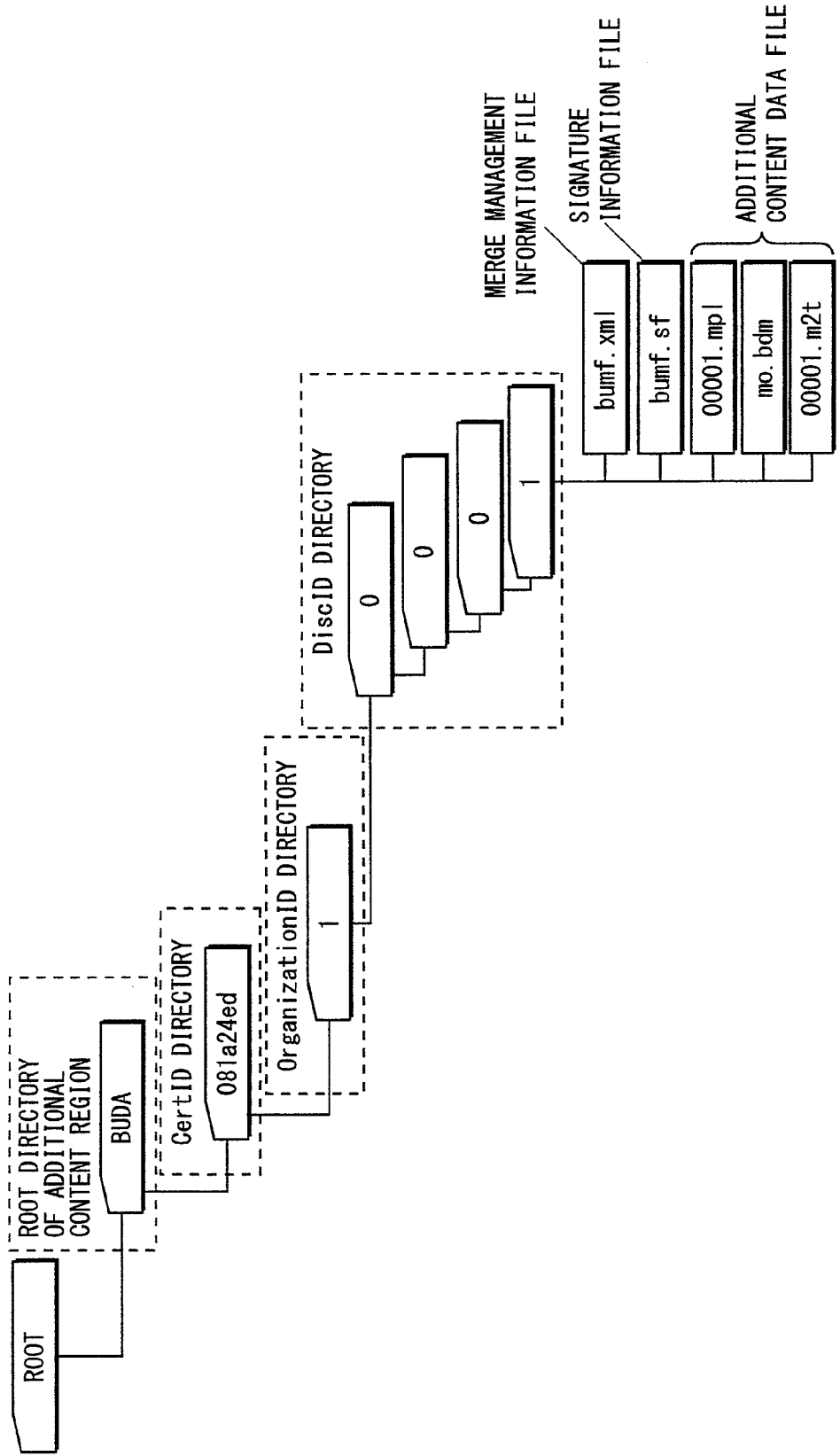
FIG. 18 shows the directory structure of a removable medium in Embodiment 2.

In the case where "0"s in the upper digits are omitted, the removable medium has the directory structure as shown in FIG. 18.

FIG. 18 shows the directory structure on the removable medium in Embodiment 2. The Organization ID directory has a directory name that is a 32-bit OrganizationID shown by index.bdmv in hexadecimal notation, and the DiscID directory has a directory name that is a 128-bit DiscID shown by index.bdmv in hexadecimal notation.

The entire path length of the DiscID is shortened by omitting the first "0"s of the Disc ID. However, if the first eight characters are all "0", the directory name of the DiscID includes only one character, namely "0". Also, if "0"s appear in the middle of the DiscID instead of the beginning thereof, the "0"s must not be omitted. In other words, when DiscID=0000000012345678123456781234567812345678, the directory structure of the DiscID is shown as 0/12345678/12345678/12345678, by omitting the first "0"s of the DiscID. However, when DiscID=1234567800000000123456781234567812345678, the directory structure of the DiscID is shown as 12345678/00000000/12345678/12345678, without omitting any of the "0"s of the DiscID. Note here that the first "0"s of the CertID directory may also be omitted in the same manner as the DiscID.

Figure 19:
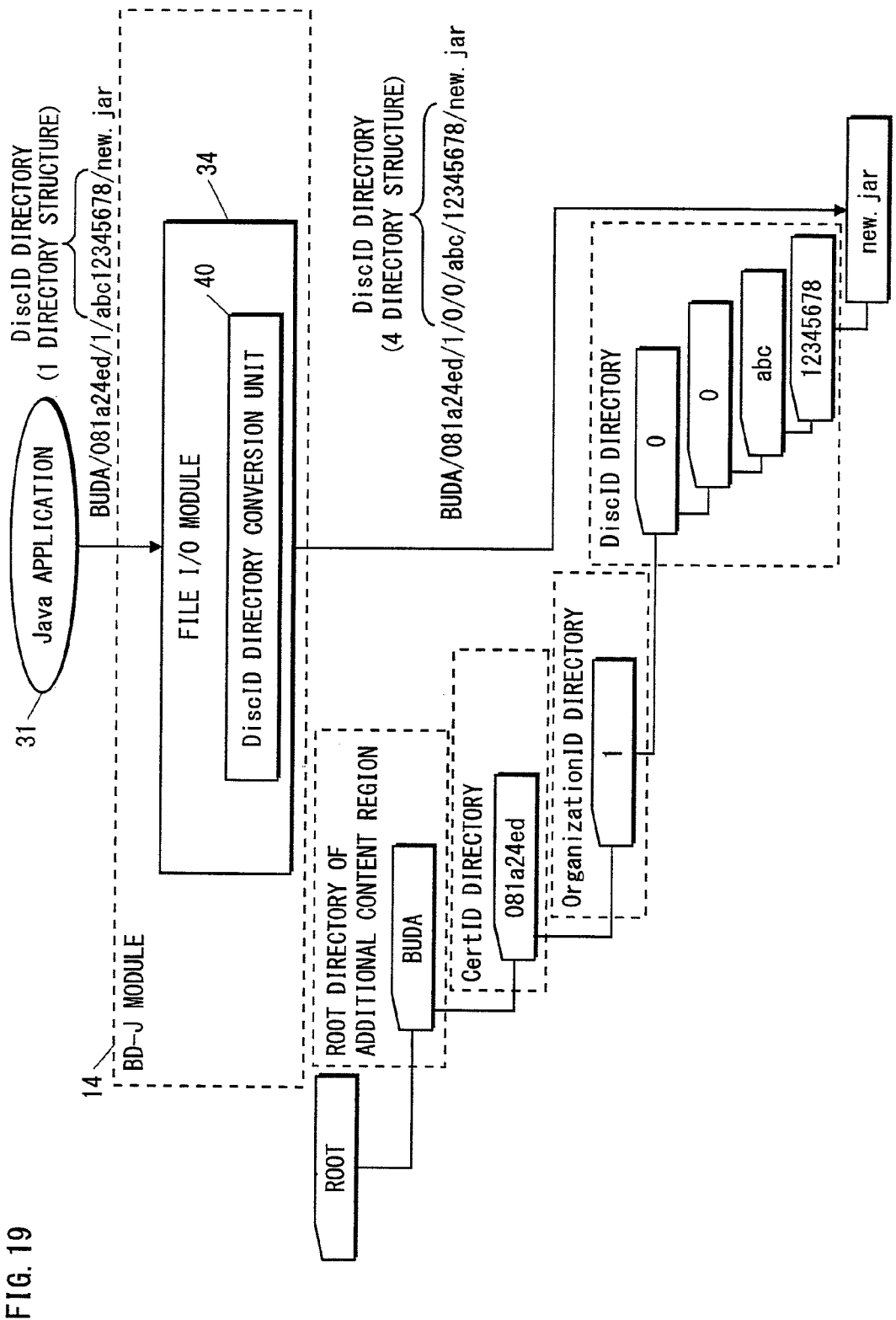
FIG. 19 shows access to a DiscID directory in Embodiment 2.

FIG. 19 shows access from the Java(™) application to the DiscID directory in Embodiment 2. Although the DiscID directory shows a 128-bit Disc ID described by index.bdmv, and has a four-layer structure, the Java(™) application accesses the DiscID directory as one directory. For example, when the structure of the DiscID directory is 0/0/abc/12345678, the Java(™) application accesses the DiscID directory as one directory of abc 12345678, when acquiring the merge management information file.

Upon detection of the access to the DiscID directory, the file I/O module 34 causes the DiscID directory conversion unit 40 to perform a path conversion on the DiscID directory, so that the DiscID directory has the four-layer directory structure. Upon receipt of a file path in which the DiscID directory is treated as one directory, the DiscID directory conversion unit 40 divides the DiscID directory whose name is treated as one directory, into four directories.

Figure 20:
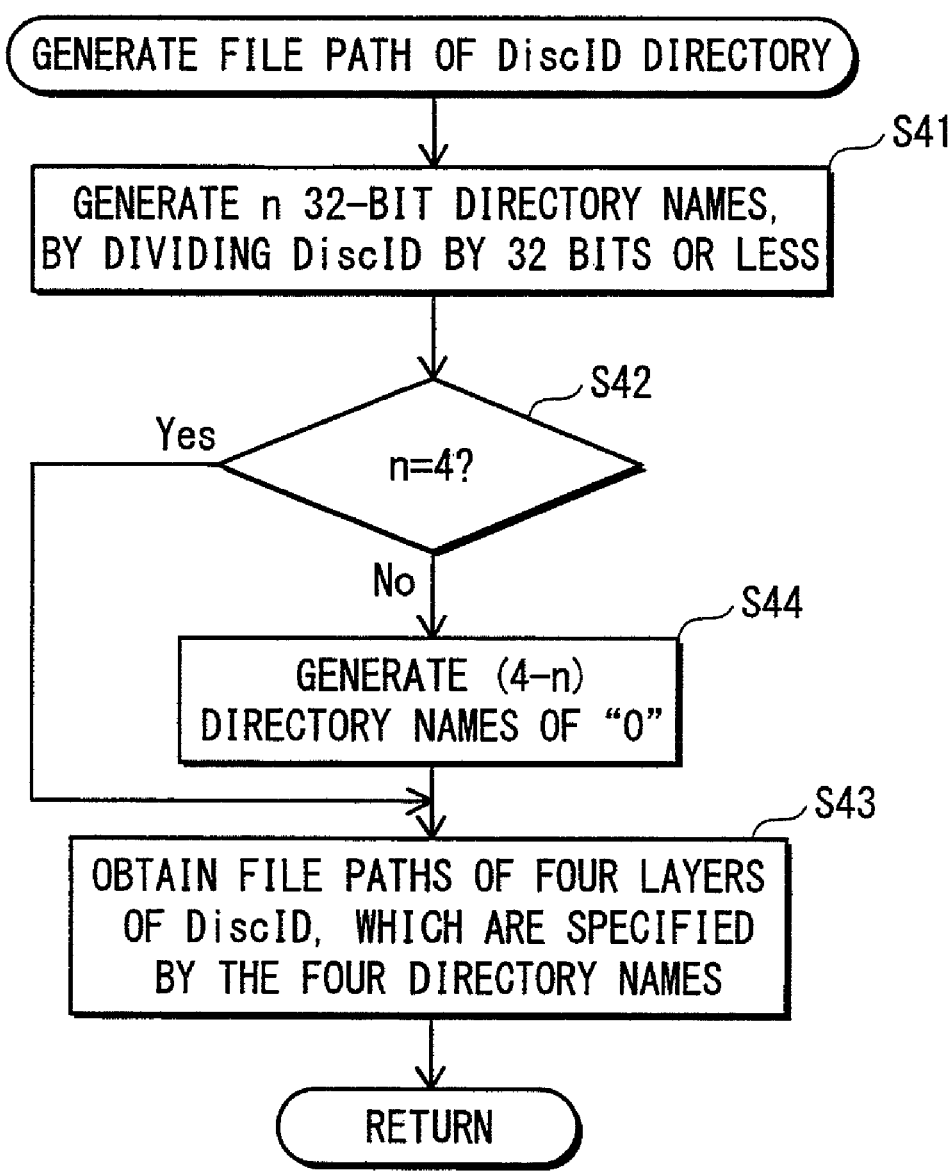
FIG. 20 is a flowchart showing the process steps of dividing the DiscID directory whose name is treated as one directory name, into four directories.

FIG. 20 is a flowchart showing the process steps of dividing the DiscID directory whose directory name is treated as one directory name, into four directories. In step S41, the DiscID directory conversion unit 40 divides the DiscID by 32 bits, so as to generate n 32-bit directory names. In step S42, the DiscID directory conversion unit 40 judges whether the number n of the generated directory names is four. When the number n is four, the DiscID directory conversion unit 40 obtains a file path of the DiscID having four layers, which is specified by four directory names that have been generated in step S43. When the number n is not four, the DiscID directory conversion unit 40 generates "4-n" directory names of "0".

As described above, according to the present Embodiment, it is possible to shorten the name of a file path in the removable medium. Also, the Java(™) application can perform an I/O process in a simple manner, by handling the four-layered DiscID directory as one directory.

(Embodiment 3)

The present embodiment relates to an improvement of process steps when the BD-ROM is mounted, in a state where an additional content data file is stored on the removable medium with the directory structure shown in Embodiment 1.

Figure 21:
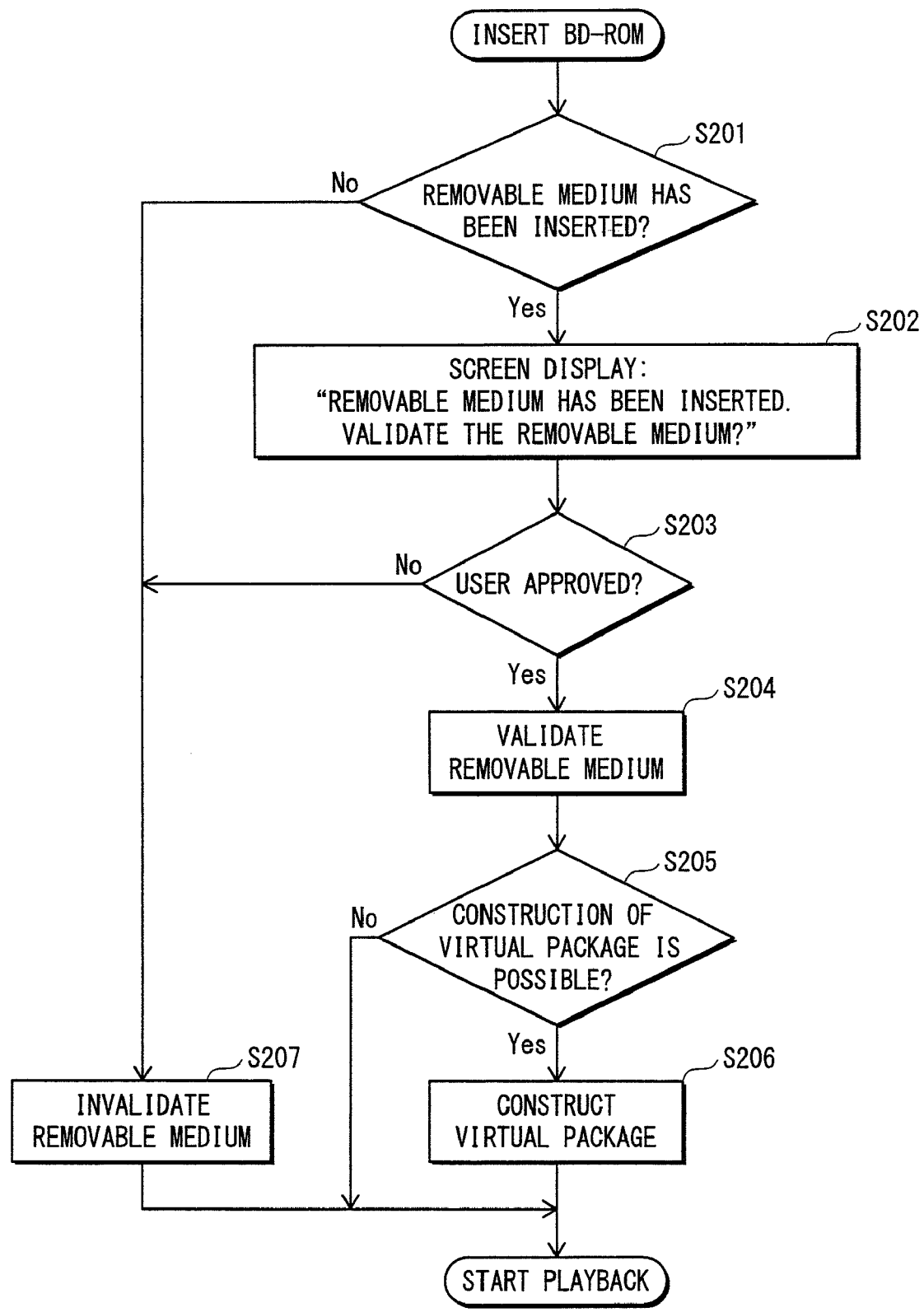
FIG. 21 is a flowchart from when a BD-ROM is inserted to when the BD-ROM is played back in Embodiment 3.

FIG. 21 is a flowchart from when the BD-ROM is inserted to when the BD-ROM is played back while the removable medium is taken into consideration. When the BD-ROM is inserted, it is judged whether the removable medium has already been inserted (step S201). When it is judged that the removable medium has not been inserted, the playback is started by invalidating the removable medium (step 207). When it is judged that the removable medium is invalid, it is possible to judge whether a virtual package can be constructed with use of an additional content file on the Built-In medium. When it is judged that a virtual package can be constructed with use of the additional content file on the Built-In medium, the playback is started by constructing the virtual package with the additional content file on the Built-In medium and the data on the BD-ROM.

When it is judged that the removable medium has already been inserted in step S201, an inquiry is made as to whether a user desires to validate the removable medium (step S202). This inquiry step may be omitted if the playback device is set to "prioritize removable medium" in advance by the user. Similarly, this inquiry step may also be omitted if the setting "prioritize removable medium" has been predetermined in the playback device.

In step S203, it is judged whether the user has approved the validation of the removable medium. When it is judged that the user has approved the validation (Yes in step S203), the inserted removable medium is validated in step S204. Specifically, when the removable medium is validated, the removable medium has a directory structure such as a BUDA directory, a CertID directory, an OrganizationID directory, and a DiscID directory. Also, among these directories, access to an additional content data file in the DiscID directory is possible, and the Java(™) application can read and write files on the removable medium, via the file I/O module 34.

After the removable medium is validated in step S204, it is judged whether a virtual package can be constructed with use of data on the removable medium (step S205). When it is judged that the virtual package cannot be constructed, only data on the BD-ROM is played back in a state where the removable medium is validated. When it is judged that the virtual package can be constructed in step S205, the virtual package is constructed with use of the additional content on the removable medium (step S206), and the playback of the virtual package is started.

Figure 22:
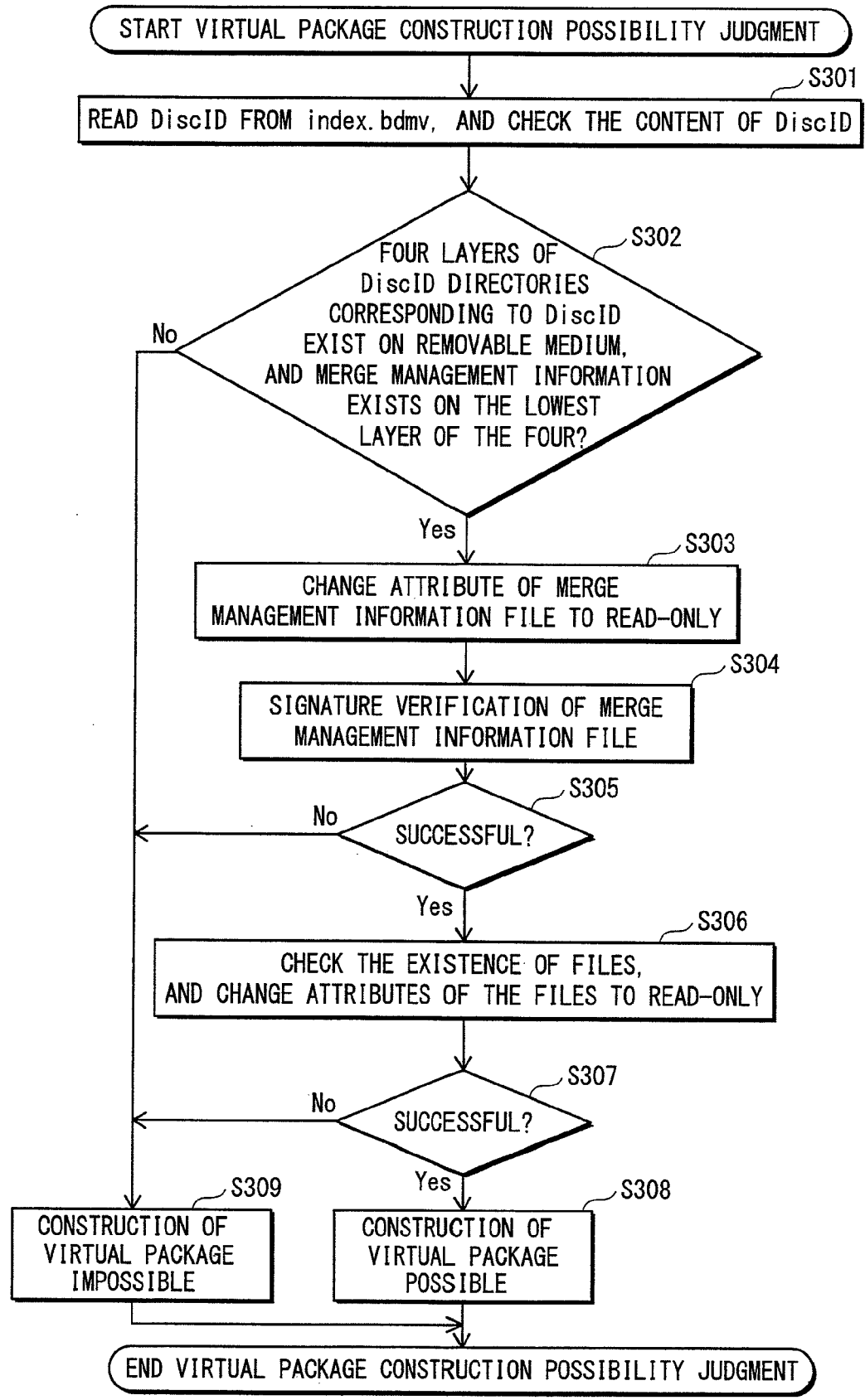
FIG. 22 is a flowchart of a judgment process of a virtual package construction in Embodiment 3.

FIG. 22 is a flowchart of a judgment process, where a judgment is made as to whether a virtual package can be constructed. First, the DiscID of the BD-ROM that has been inserted is read from Index.bdmv, and the content of the DiscID is checked (step S301). The reading and checking of the DiscID is performed by the virtual file system 23 acquiring the value of the DiscID via the DiscID confirmation module 37. Note that the DiscID may be checked by the virtual file system 23 directly accessing the BD-ROM.

Upon completion of the checking of the DiscID of the inserted BD-ROM, a search is performed to determine whether the four-layered DiscID directory corresponding to the DiscID exists on the removable medium, and a judgment is made as to whether a merge management information file and a signature information file exist (step S302). At this time, when the removable medium is valid, the DiscID directory on the removable medium is searched for; and when the removable medium is invalid, the DiscID directory on the Built-In medium is searched for. If neither of the merge management information file and the signature information file exists in the DiscID directory corresponding to the DiscID of the inserted BD-ROM, it is judged that a virtual package cannot be constructed.

When it is judged that the corresponding merge management information file and the corresponding signature information file exist in step S302, the attribute of each of the merge management information file and the signature information file is changed to read-only (step S303), and the signature of the merge management information file is verified with use of the signature information file (step S304). When the signature verification fails, it is judged that a virtual package cannot be constructed (No in step S305).

When the signature verification is successful (Yes in step S305), it is checked whether files described on the file storage position information of the merge management information file exist. When such files exist, the attributes of the files are changed to read-only (step S306). In step S307, it is judged whether the change has been successfully made. When one or more of the files described on the file storage position information are missing, and the construction of the virtual package is impossible, a result of the judgment in step S307 is No. When all the files described on the file storage position information exist, and the attributes of the files can be changed to read-only, a result of the judgment in step S307 is Yes, and it is judged that the construction of the virtual package is possible (step S308).

Figure 23:
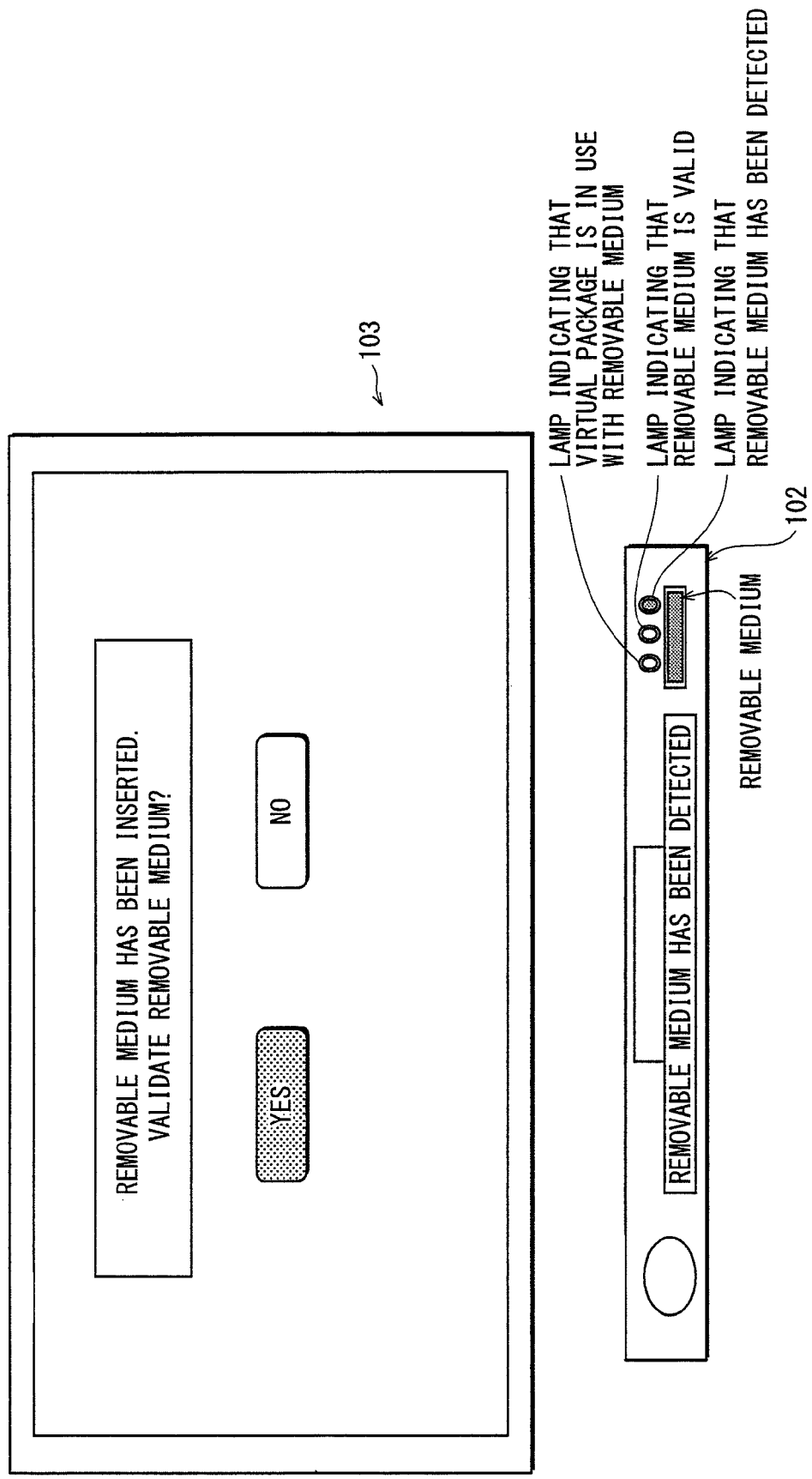
FIG. 23 shows an example of a screen display when the BD-ROM is inserted in Embodiment 3.

FIG. 23 shows an example of a screen display when the process of step S203 of FIG. 21 is performed, which is for confirming the user whether the removable medium is to be validated. In this example, an output screen and a display panel of the playback device both indicate that the removable medium has been inserted. However, it is of course acceptable that only one of the output screen and the display panel indicates that the removable medium has been inserted.

Also, the output screen shows selection buttons for a user, so that the user can select one of the buttons to determine whether the removable medium is to be validated or invalidated. In order to make this selection, it is possible to use keys of a remote controller instead of using the selection buttons on the output screen, by setting in advance two of the keys of the remote controller to a key for validation and a key for invalidation, respectively. Also, if there is no key input for more than a predetermined period of time, the removable medium maybe either validated or in validated.

The playback device includes three lamps, namely a lamp (hereinafter referred to as "detection lamp") indicating that the removable medium has been detected, a lamp (hereinafter referred to as "validation lamp") indicating that the removable medium is valid, and a lamp (hereinafter referred to as "usage lamp") indicating that the virtual package is being played back with the data on the removable medium. When the removable medium is inserted, the detection lamp lights up so as to show that the removable medium has been inserted, regardless of whether the removable medium is valid or invalid.

The validation lamp lights up when the removable medium is inserted and also valid, regardless of whether the data of the removable medium is in use as the virtual package or not.

The usage lamp lights up when the removable medium is inserted, valid, and in use as the virtual package.

In step S203, the removable medium has been inserted but not validated yet. Therefore, only the detection lamp lights up. When the removable medium is validated in step S204, the validation lamp lights up. When the virtual package is constructed with use of the removable medium in step S206, the usage lamp lights up as shown in FIG. 24. Note that these three lamps maybe combined into one lamp, and three different states of the removable medium maybe indicated by changing the color of the lamp, changing the flashing speed of the lamp, or the like. Also, instead of using such a lamp, the states of the removable medium may be shown on the display monitor of the playback device. Furthermore, the present Embodiment uses a lamp as an example in order to indicate the states of the removable medium. However, it is possible to use a display device instead of a lamp.

Figure 25:
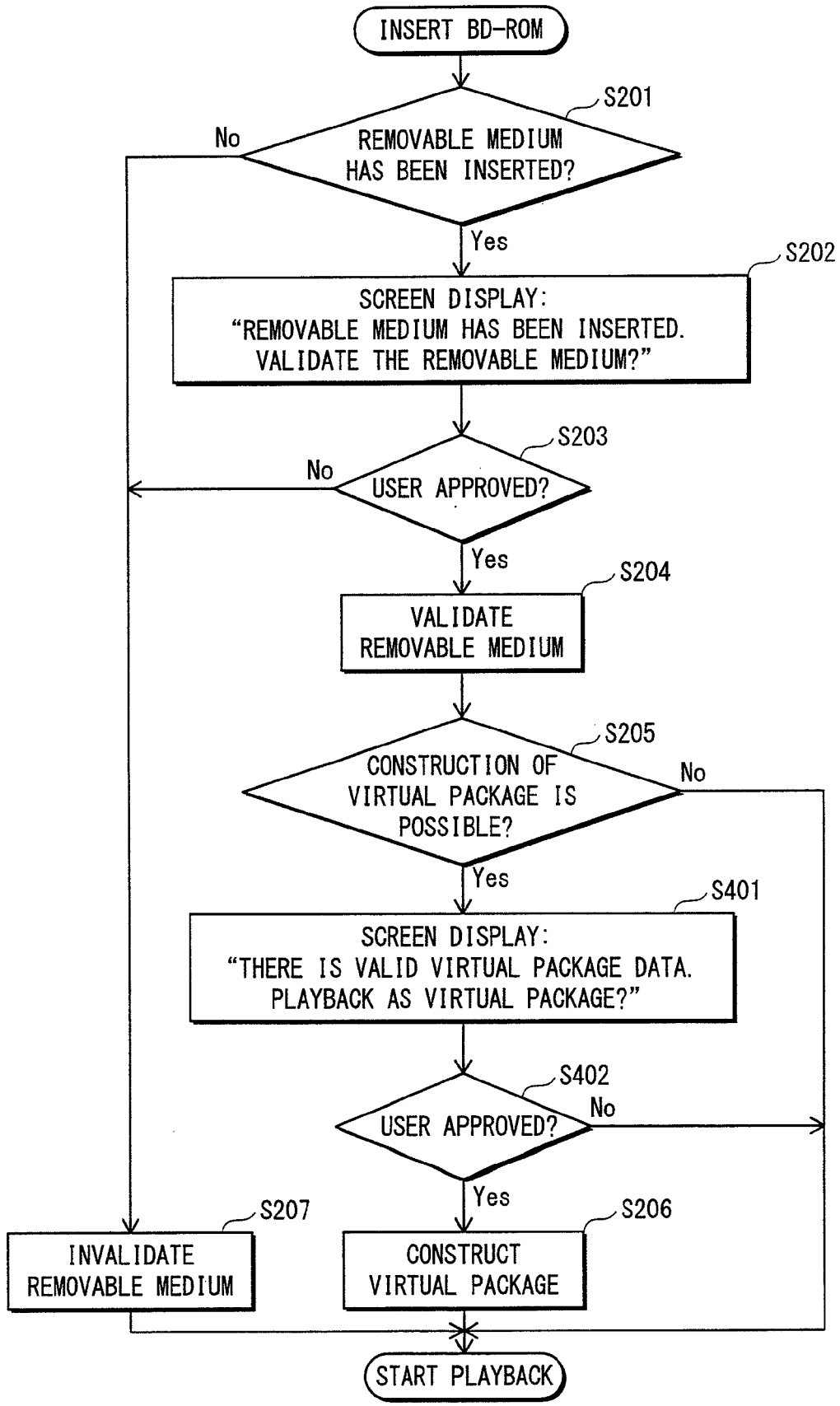
FIG. 25 is a flowchart from when the BD-ROM is inserted to when the BD-ROM starts being played back in Embodiment 3.

FIG. 25 is a flowchart in which an inquiry into whether to playback as the virtual package is added to the flowchart of FIG. 21. In the flowchart of FIG. 21, when the user chooses to validate the removable medium, the virtual package is always constructed as long as the construction of the virtual package is possible. The flowchart of FIG. 25 includes step S401, which is a step for inquiring of a user whether the virtual package is to be constructed. In this way, although the removable medium is valid and the construction of the virtual package is possible, the playback may not be performed with use of the virtual package depending on the user's selection.

It is possible to construct the virtual package by omitting the inquiry to the user in step S401, as in the same manner as step S203, as long as the playback device is set to "prioritize removable medium" in advance by a user. Similarly, the inquiry to the user in step 401 may also be omitted if the setting "prioritize removable medium" has been predetermined in the playback device.

Figure 26:
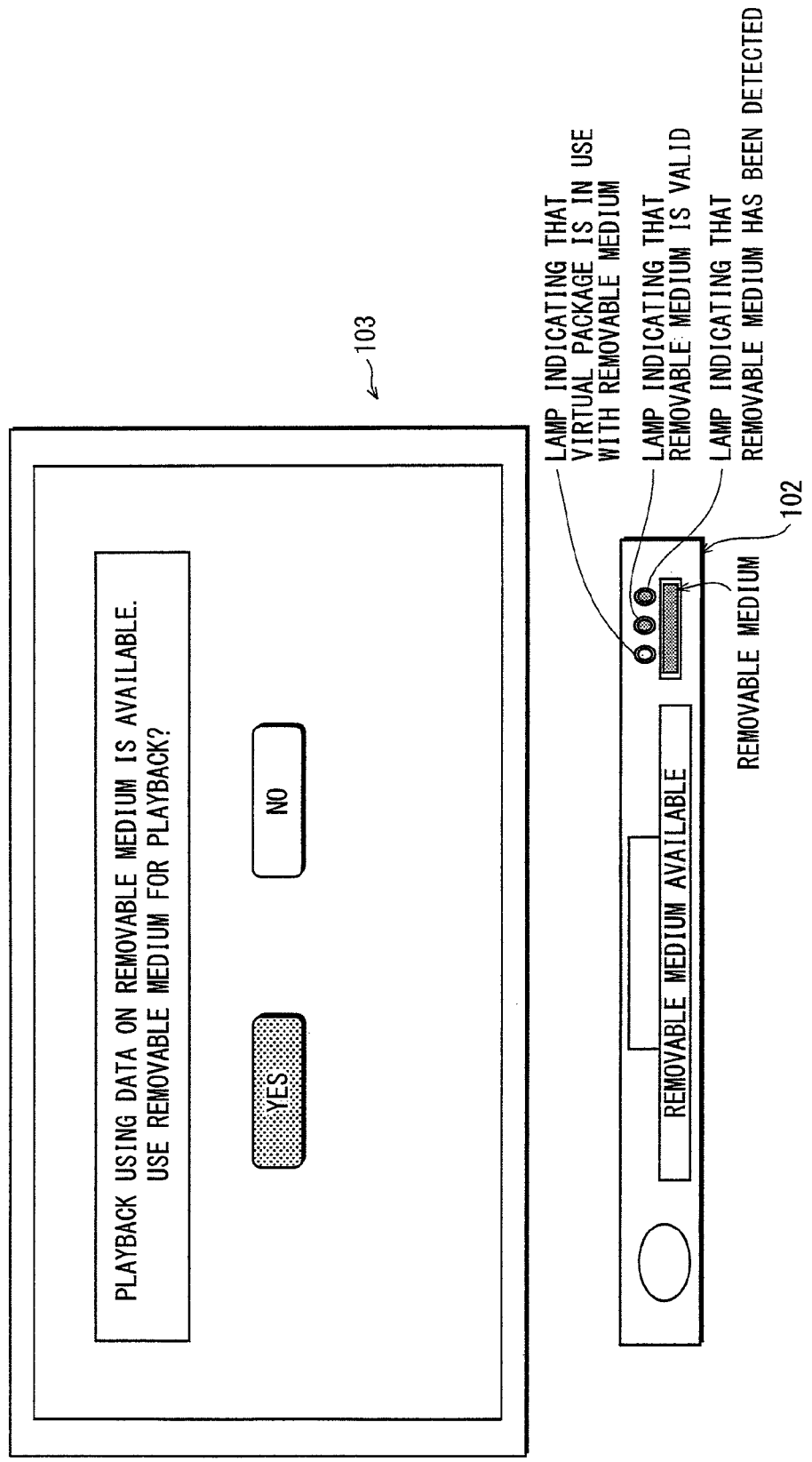
FIG. 26 shows one example of a confirmation screen for playback with use of the removable medium in Embodiment 3.

FIG. 26 shows one example of a screen display for inquiring of a user in step S401 as to whether the virtual package with use of the removable medium is to be validated. In this example, the output screen and the display panel of the playback device both indicate that the removable medium is available, in the same manner as shown in FIG. 23. However, it is of course acceptable that only one of the output screen and the display panel indicates that the removable medium is available.

Also, the output screen shows selection buttons for a user, so that the user can select one of the buttons and determine whether to use the removable medium. In order to make this selection, it is possible to use keys of the remote controller instead of using the selection buttons on the output screen, by setting in advance two keys of the remote controller to a key for confirmation and a key for rejection, respectively. Also, if there is no key input for more than a predetermined period of time, the removable medium may be either used or not used to play back the virtual package.

Figure 27:
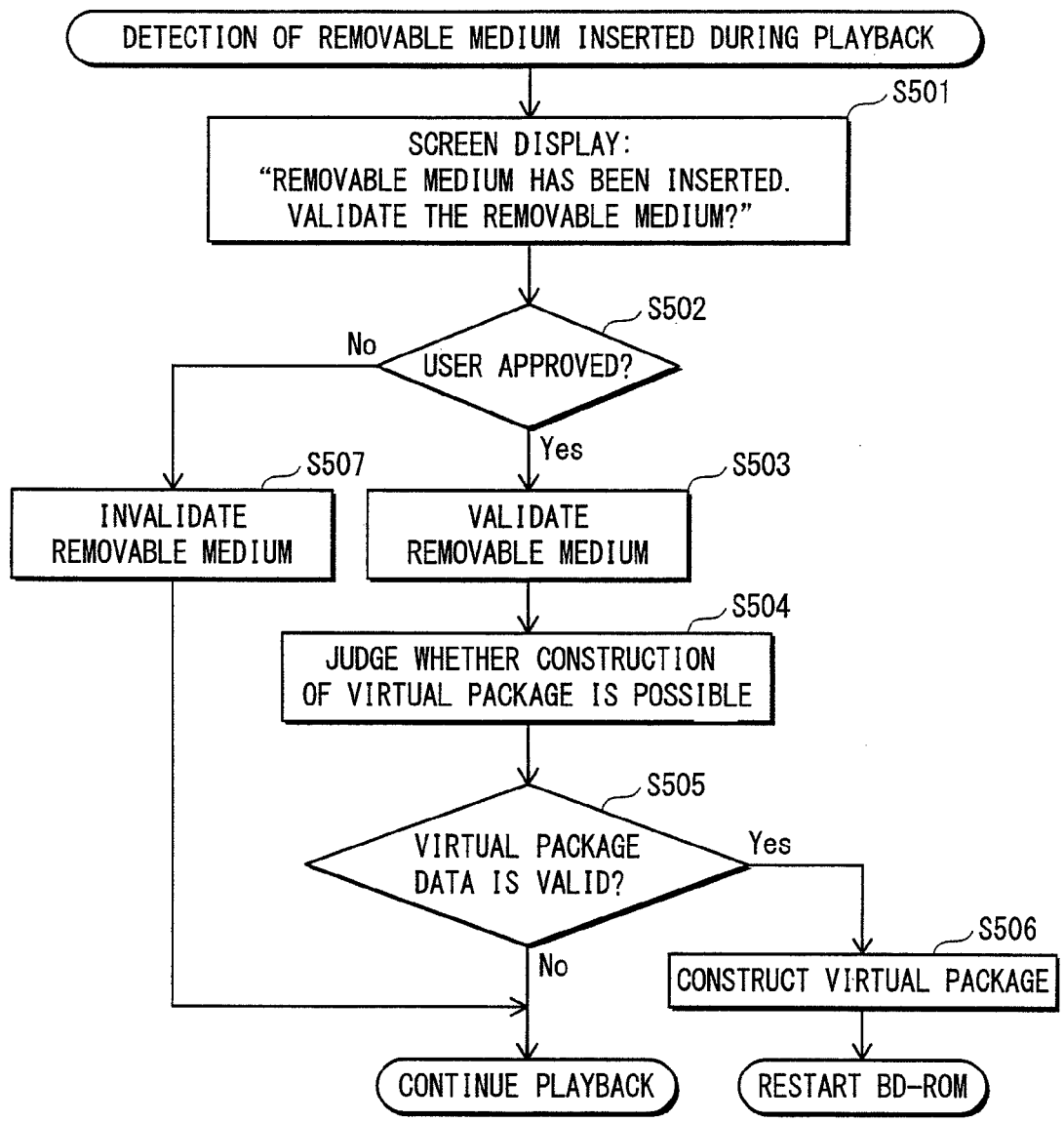
FIG. 27 is a flowchart showing a process in a case where the removable medium is inserted during playback in Embodiment 3.

FIG. 27 is a flowchart showing a process performed when the removable medium is inserted during playback. When it is detected that the removable medium is inserted during playback, a message is displayed to indicate to the user that the removable medium has been detected, and to ask the user whether to validate the removable medium (step S501). In step S502, it is judged whether the user has approved to validate the removable medium. When the user chooses not to validate the removable medium, the playback is continued by invalidating the removable medium (step S507). When the user chooses to validate the removable medium, the removable medium is validated (step S503), and then it is judged whether the virtual package can be constructed with use of the removable medium (step S504). The judgment of whether the virtual package can be constructed is made in a process shown in the flowchart of FIG. 22. When it is judged that the virtual package cannot be constructed (No in step S505), the playback is continued without constructing the virtual package. When it is judged that the virtual package can be constructed (Yes in step S505), the virtual package is constructed (step S506), and the playback of the BD-ROM is restarted. Here, the "restart" of the BD-ROM means to start the playback from one of "First Play" title, "Top Menu" title, and the beginning of a title that was being played back before the construction of the virtual package, after the current playback is stopped and the virtual package is constructed.

The steps S501 and S502, which are for inquiring of a user whether to invalidate the removable medium, may be omitted if the playback device is set to "prioritize removable medium" in advance by the user, in the same manner as shown in step S202. Also, after it is judged in step S505 that the virtual package can be constructed, an inquiry may be made to the user as to whether the virtual package is to be constructed with use of the removable medium, in the same manner as shown in step S401.

Note that in a case where the removable medium is inserted and validated while the virtual package is already being played back with use of data on the Built-In medium, the Built-In medium may be invalidated by restarting the BD-ROM, regardless of whether the virtual package is to be constructed.

Figure 28:
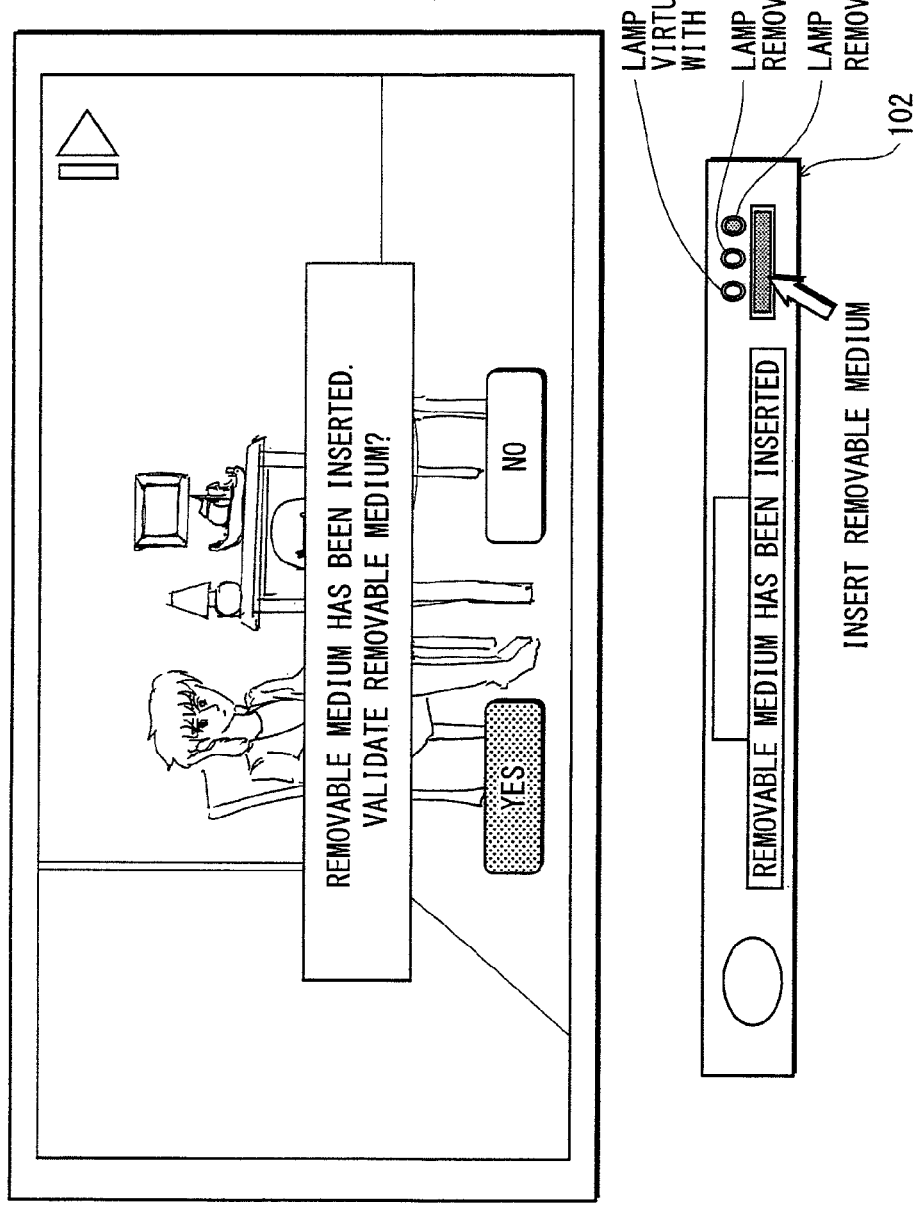
FIG. 28 is an example of a screen display when the removable medium is inserted during playback in Embodiment 3.

FIG. 28 shows one example of a screen display in step S502, which is for checking with the user as to whether the removable medium is to be validated. The process shown in FIG. 28 is basically the same as that shown in FIG. 23, but is different in that the AV playback has already been started. In FIG. 28, the AV playback is paused to wait for input from a user. However, it is possible to wait for the input from the user during the AV playback.

Figure 29:
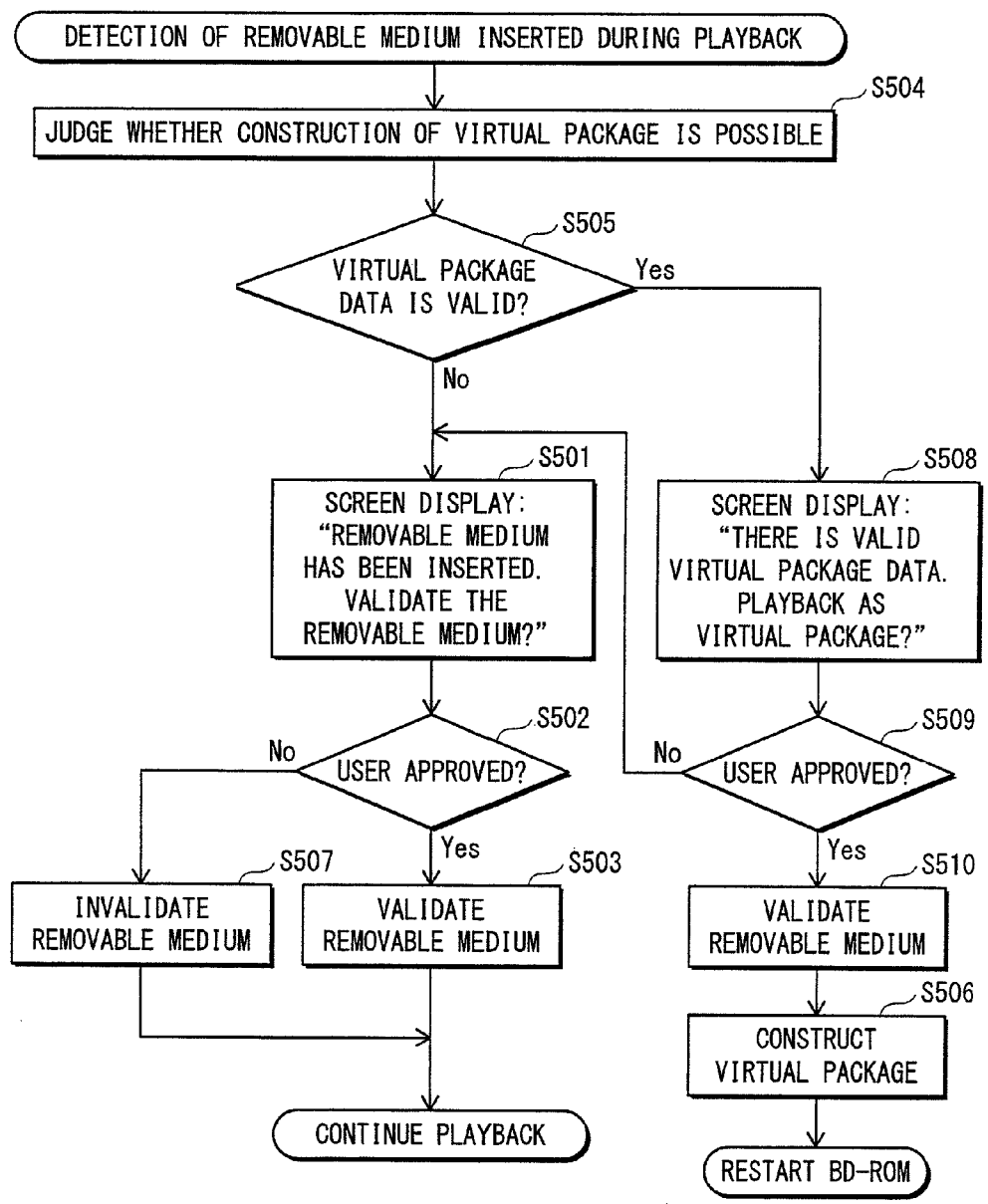
FIG. 29 is a flowchart showing a process in a case where the removable medium is inserted during playback in Embodiment 3.

FIG. 29 is a flowchart showing a process in which the inquiry to the user is made after the removable medium has been inserted and the judgment of whether to construct the virtual package has been performed. The flowchart of FIG. 29 is different from that of FIG. 27 in that the judgment of whether to construct the virtual package has already been made before the inquiry to the user. Step S504 is a process for judging whether the virtual package can be constructed, and step S505 is a process for judging whether the virtual package data is valid. When it is judged that the virtual package cannot be constructed in step S504 and the virtual package data is not valid in step S505, it is only inquired of the user whether the user desires to validate the removable medium (step S501).

When it is judged that the virtual package can be constructed and the virtual package data is valid, step S508 is performed to inquire of the user whether to use the removable medium as the virtual package. Then, the process is moved to step S509 to judge whether the user has approved of the construction of the virtual package. When it is judged that the user has disapproved of the construction of the virtual package, step S501 is performed to inquire whether to validate the removable medium. When it is judged that the user has approved of the construction of the virtual package, the removable medium is validated and then the virtual package is constructed in step S506.

Figure 30:
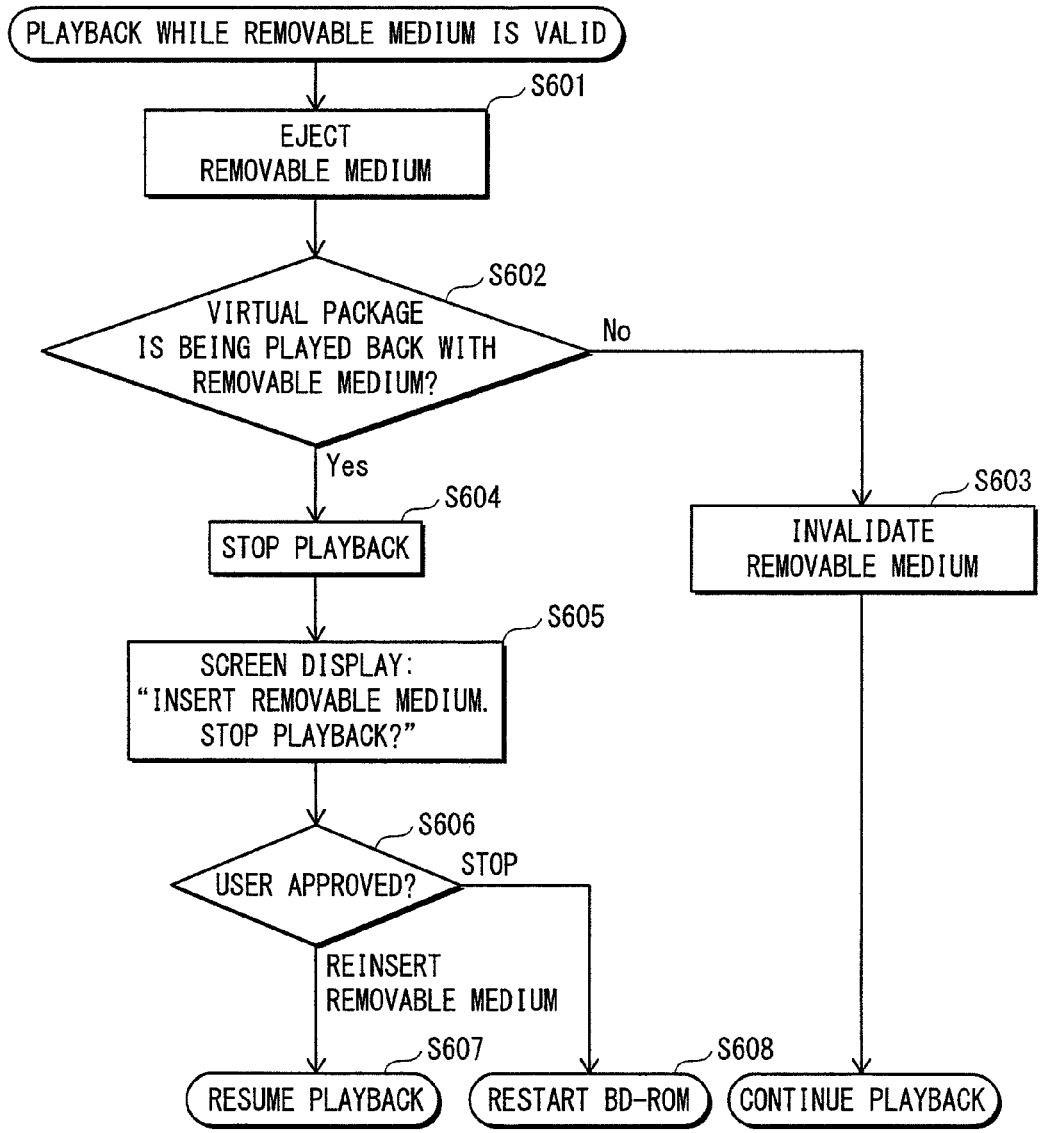
FIG. 30 is a flowchart showing a process in a case where the removable medium is removed during playback in Embodiment 3.

FIG. 30 is a flowchart showing a process performed when the removable medium is ejected during playback in a state where the removable medium is valid. When the removable medium is ejected during playback in a state where the removable medium is valid (step S601), it is judged whether the virtual package is being played back with use of the removable medium (step S602). When it is judged that the virtual package is being played back without use of the removable medium, the playback is continued by invalidating the removable medium (step S603).

When it is judged that the virtual package is being played back with use of the removable medium, the playback is stopped (step S604). Then, a message is displayed to indicate to the user that the removable medium has been ejected, and an inquiry is made to the user as to whether the playback is to be resumed by reinserting the removable medium or the playback is to be stopped and then restarted without use of the removable medium (step S605). Step S606 is performed to make a judgment with respect to the inquiry. When the removable medium is reinserted, the playback is resumed in step S607. When the removable medium has not been inserted for more than a predetermined period of time, or when the user has chosen to stop the playback, the BD-ROM is restarted without use of the removable medium in step S608.

Note that it is possible to validate the Built-In medium and judge whether the virtual package can be constructed with the data on the Built-In medium, after the removable medium is invalidated in step S603 or after the user chose to stop the playback in step S605. When it is judged that the virtual package can be constructed with the data on the Built-In medium, the virtual package is constructed with the data on the Built-In medium and the BD-ROM is restarted. Also, it is possible to let the user determine whether to construct the virtual package with the data on the Built-In medium, when it is judged that the virtual package can be constructed.

If the playback device is set to "stop the playback if the removable medium in use is ejected" in advance by the user, the inquiry to the user in step S605 may be omitted, and the BD-ROM may be restarted by stopping the current playback. Similarly, the inquiry in step S605 may be omitted if the setting "stop the playback if the removable medium in use is ejected" has been predetermined in the playback device. Note that the playback device does not always need to automatically restart the BD-ROM after stopping the playback. Instead, the playback device may wait for an operation from a user (pressing down the playback button, for example) in a state where the playback is stopped.

Also, the virtual package may be played back with use of data copied onto the Built-In medium from the removable medium when the removable medium is inserted. In this case, the playback is not stopped even though the removable medium is ejected in step S601, since the removable medium is invalid. Accordingly, the removable medium is judged to be invalidated, and the process moves to step S603 to continue the playback.

FIG. 31 shows one example of a screen display in step S605 for inquiring of the user whether the playback is to be played back by reinserting the removable medium or the playback with use of the removable medium is to be stopped. In this example, the output screen and the display panel of the playback device both indicate that the removable medium has been ejected. However, it is of course acceptable that only one of the output screen and the display panel indicates that the removable medium has been ejected. Also, the output screen shows selection buttons for a user, so that the user can select one of the buttons to determine whether to stop the playback. In order to make this selection, it is possible to use a key of the remote controller instead of using the selection buttons on the output screen, by setting in advance the key as a key for stopping the playback. Also, if there is no key input for more than a predetermined period of time, the playback may be stopped.

Note that in the present embodiment, while the removable medium is in use, the validation lamp notifies the user that the removable medium is in use. However, it is possible to protect the removable medium such that the removable medium cannot be physically removed while in use.

(Supplementary Remarks)

Although the best mode known to the applicant at the time the application was filed has been described above, further improvements and modifications can be added in relation to the technical topics shown below. Whether or not to perform these improvements and modifications is arbitrary, and it should be noted that these improvements and modifications arise from the intentions of the executor of the invention.

<Usable Character Codes>

The above-described Embodiments describe one example where each of the file names, the directory names, and the extension names is composed of ASCII codes. However, in the case where each of the file names and the directory names is composed of character codes other than the ASCII codes, namely JIS Kanji character codes, SHIFT-JIS Kanji character codes, or Unicode characters, the number of characters of each of the file names and the directory names on the removable medium is limited to the number obtained by dividing 32 bits by the bit length of one character.

Unicode is a code system where most characters in the whole world are each represented by a 16-bit code so as to enable multilingual processing in one code system. When file names and directory names are represented by the Unicode characters, each of the file names and the directory names to be recorded onto the removable medium is composed of two characters or less (=32 bits/16 bits).

Aside from the characters mentioned above, the file names and the directory names may be represented by BIG5 character codes, GB18030-2000 character codes, or EUC-KR character codes.

<Variation of Description of Merge Management Information File>

In the merge management information file, the URLs on the Internet may be associated with the file paths on the removable medium.

Also, in a directory service based on LAN, WAN, etc., a file path for specifying a resource may be associated with a file path on the removable medium. For example, directory information indicating a directory service that is by X.500 series of ITU-T recommendations and that realizes a worldwide name service may be written into the merge management information file and associated with a file path on the removable medium.

In this case, it is preferable that the network interface of the playback device supports LADP (Light weight Directory Access Protocol). The version 3 of the LADP adapts UTF-8, thereby realizing conversion from Unicode to a byte sequence. Therefore, it is possible, for example, to associate a file path using Japanese with a file path on the removable medium, in the merge management information file.

<Type of Playback Device>

A targeted playback device may only have a playback function for playing back a recording medium, or may have a recording function.

<Variation of Programming Language>

In the above-described Embodiments, Java(™) is used as the programming language of the virtual machine. However, the programming language does not always need to be the Java(™), and may be B-Shell, Perl Script, ECMAScript, etc. that are used in UNIX(™) OS.

<Basic Data in Virtual Package Generation>

The above-described Embodiments describe a case where the virtual package is constructed based on data recorded on the BD-ROM, which is one example of a first recording medium. However, when BD-ROM data, which is data for the BD-ROM, has been recorded on a rewritable recording medium, the virtual package may be constructed based on the BD-ROM data.

Here, the rewritable recording medium used for the generation of the virtual package may be a BD-R, or a BD-RE. Furthermore, the recording medium may be an optical disc other than a BD-R or a BD-RE, such as a CD-ROM, a CD-R, a CD-RW, a DVD-ROM, a DVD-R, a DVD-RW, a DVD-RAM, a DVD+R, or a DVD+RW.

<Recording with Respect to SD Memory Card>

In the "SD memory card" adopted in the above-described Embodiments, rewriting of data is performed in the unit of an erasable block. Also, when writing data into an erasable block of the SD memory card, data that has been recorded in the erasable block needs to be erased to start over again. Each erasable block has, for example, a data size of 16K bytes, and has a physical characteristic in which the rewriting of data is limited to several hundred thousand times.

Also, a file in the FAT file system is composed of one or more clusters. Since each cluster has a data size of 16K bytes, 32K bytes, or 64K bytes, it is preferable in the file system of the SD memory card that the boundary of a set of the one or more clusters matches the boundary of each erasable block.

In this case, the relationship "file=one or more clusters=erasable block" is established. This means that, when the state of an entry region changes, a decrease in the number of files to be rewritten leads to a decrease in the number of times the erasable blocks are rewritten. Therefore, it is possible to extend the life of the SD memory card by decreasing the number of times to rewrite.

Furthermore, the recording process of files and directory entries that are unique to the BD-ROM among the files and the directory entries shown in FIG. 10 is preferably performed in a manner that each of the files and the directory entries fits in one or more erasable blocks. Here, the files and directory entries that are unique to the BD-ROM include the directory entry of the DiscID directory, the merge management information file "bumf.xml", the signature information file "bumf.sf", and the additional content data files "00001.mpl", "mo.bdm", and "00001.m2t".

The recording process as described above makes it possible to minimize the number of erasable blocks that are rewritten when updating the merge management information file, the signature information file, and the additional content data files.

Similarly, it is also preferable to perform the recording process of the Root directory entry and redundant FAT in a manner that each of the Root directory entry and the redundant FAT fits in one or more erasable blocks. This makes it possible to minimize the number of erasable blocks that are rewritten when updating the additional content data files.

<System LSI>

It is preferable that parts of the hardware of the playback device shown in FIG. 5 are realized as one system LSI, the parts being mainly composed of logical elements, excluding mechanical components (the BD drive 1) and components (the video plane 5, graphics plane 8) that are implemented by large-capacity memories. This is because the parts mainly composed of logical elements can be densely integrated.

A system LSI refers to a package in which a bare chip has been mounted on a high density substrate. A system LSI also refers to a package in which two or more bare chips have been given the outward construction of a single LSI by mounting the bare chips on a high density substrate. This kind of system LSI is called a multi-chip module.

Focusing now on the types of packages, system LSIs include QFP (quad flat packages) and PGA (pin grid arrays). A QFP is a system LSI in which pins are attached to the four-sides of the package. A PGA is a system LSI in which a majority of the pins are attached to the bottom of the package.

These pins act as interfaces to other circuits. Given that the pins in a system LSI have this role as interfaces, the system LSI acts as the core of the playback device if other circuits are connected to these pins in the system LSI.

Such a system LSI can be incorporated into various apparatuses that play back video, such as a television, a game machine, a personal computer, a one-segment mobile phone, as well as the playback device, thereby greatly broadening the use of the present invention.

Since a system LSI as described above realizes the function of the playback device, it is preferable that the system LSI complies with the Uniphier architecture.

A system LSI complying with the Uniphier architecture includes the following circuit blocks.

Data Parallel Processor (DPP)

The DPP is an SIMD processor in which a plurality of element processors perform the same operation. The DPP achieves a parallel decoding of a plurality of pixels constituting a picture, by causing computing units, which are respectively embedded in the element processors, to operate simultaneously with one instruction.

Instruction Parallel Processor (IPP)

The IPP includes: a "Local Memory Controller" that is composed of an instruction RAM, an instruction cache, a data RAM, and a data cache; a "Processing Unit" that is composed of an instruction fetch unit, a decoder, an execution unit, and a register file; and a "Virtual Multi Processor Unit" that causes the Processing Unit to execute a plurality of applications in parallel.

CPU Block

The CPU block includes: peripheral circuits such as an ARM core, an external bus interface (Bus Control Unit: BCU), a DMA controller, a timer, a vector interrupt controller; and peripheral interfaces such as a UART, a GPIO (General Purpose Input Output), and a sync serial interface.

Stream I/O Block

The stream I/O block performs data input/output with a drive device, a hard disk drive device, and an SD memory card drive device that are connected to external buses, via a USB interface and an ATA Packet interface.

AV I/O Block

The AV I/O block includes an audio input/output, a video input/output, and an OSD controller, and performs data input/output with a television and an AV amplifier.

Memory Control Block

The memory control block is a block that realizes the reading/writing of an SD-RAM that is connected via an external bus. The memory control block includes an internal bus connection unit that controls an internal connection between each block, an access control unit that performs data transfer with the SD-RAM connected to the outside of a system LSI, and an access schedule unit that adjusts access requests from the blocks, the requests being for accessing the SD-RAM.

The following is a detailed description of a production procedure. First, a circuit diagram of a part to be the system LSI is made based on the structure diagrams used in the above Embodiments. Then, circuit devices, ICs, and LSIs are used to realize the components in the structure diagrams.

After the components are realized, buses that connect between the circuit devices, ICs and LSIs, peripheral circuits, interfaces with external entities, etc. are defined. Further, connection lines, power lines, ground lines, clock signal lines, etc. are defined. During this defining process, the operation timings of the components are adjusted in light of the LSI specifications, and band widths necessary for the components are secured. With other necessary adjustments, the circuit diagram is completed.

Implementation designing is performed after the completion of the circuit diagram. The implementation designing refers to the creation of a substrate layout that determines where on the substrate to place the parts (circuit elements, ICs, and LSIs) in the circuit diagram created by circuit designing, and how to wire, on the substrate, the connection lines in the circuit diagram.

After the implementation designing is performed and the layout on the substrate is determined, a result of the implementation designing is converted into CAM data, and the CAM data is output to appropriate devices such as an NC machine tool. The NC machine tool performs SoC (System on Chip) implementation or Sip (System in Package) implementation based on the CAM data. The SoC implementation is a technique for fusing a plurality of circuits to a single chip. The Sip implementation is a technique for forming a plurality of chips into a single package with use of resin or the like. Through the above-described processes, a system LSI according to the present invention can be produced based on the internal structure diagram of the playback device in the above-described Embodiments.

Note that an integrated circuit produced as described above may be referred to as an IC, an LSI, a super LSI, or an ultra LSI, depending on the degree of integration.

When a system LSI is realized with use of an FPGA (Field Programmable Gate Array), a large number of logic elements are arranged in a lattice pattern. Therefore, the hardware structure shown in each of the above-described Embodiments can be realized by connecting vertical and horizontal wires, based on input/output combinations described in a LUT (Look Up Table). The LUT is stored in a SRAM (Static Random Access Memory), and the data in the SPAM is erased when the power is turned off. Therefore, when the FPGA is used, it is necessary to define Config information, thereby writing, into the SRAM, the LUT that realizes the hardware structure in each of the above-described Embodiments.

Industrial Applicability

The playback device of the present invention can be manufactured industrially with use of the internal structure shown in each of the above-described Embodiments, and therefore can be used in a manufacturing industry.

The invention claimed is:

1. A playback device for performing a playback process, based on a file recorded on one of (i) a first recording medium having a first file system format and (ii) a second recording medium having a second file system format, each of the first recording medium and the second recording medium being a removable recording medium that is removable from the playback device, the playback device comprising:

a manager configured to, when the first recording medium is mounted in the playback device, read an application from the first recording medium and activate the application;

a gainer configured to gain an additional content corresponding to the first recording medium from an external device, in response to a request from the application;

a writer configured to, in response to a request from the application, write a file including the additional content into a region of the second recording medium, the region being specified by a file path attached to the additional content;

a searcher configured to, when the application requests to access the second recording medium with use of a file path in the first file system format, search for an accessible file on the second recording medium based on reference information; and a reader configured to, (i) if the accessible file is found by the search, read the accessible file from the second recording medium, and (ii) if the accessible file is not found by the search, read a file from the first recording medium, wherein the reference information has been recorded on the second recording medium, and indicates a file path in the second file system format that corresponds to the file path in the first file system format, management information on the first recording medium includes a plurality of identifiers for identifying the first recording medium, the file path in the second file system format indicated by the reference information includes parts of one of the identifiers, the parts being used to specify the accessible file and obtained by dividing the one of the identifiers into parts that each have a length complying with the second file system format, and the writer writes the file into the region specified with use of the file path including the parts of the one of the identifiers.

2. The playback device of claim 1, wherein
the file system format of the second recording medium is an 8.3 format in which each of a directory name and a file name is composed of eight characters or less and an extension of the file name is composed of three characters or less.

3. The playback device of claim 1, wherein
the plurality of identifiers are an organization ID and a medium ID,
the first recording medium further includes a certificate,
the second recording medium includes (i) a certificate ID directory corresponding to a certificate ID that is an identifier calculated from the certificate, (ii) an organization ID directory corresponding to the organization ID, and (iii) a medium ID directory set corresponding to the medium ID,
the organization ID directory is located under the certificate ID directory,
the medium ID directory set is located under the organization ID directory, and is composed of a plurality of subdirectories that have a hierarchy structure where each of the subdirectories is specified by a respective one of parts of the medium ID, and
the reference information and the accessible file on the second recording medium are located in one of the subdirectories that is in a lowest layer.

4. The playback device of claim 3, wherein
the medium ID directory set is hierarchized into four subdirectories,
the medium ID of the first recording medium is a character string composed of up to 32 characters, and
each of the subdirectories constituting the medium ID directory set is provided with a directory name composed of 8 characters or less, the directory name being obtained by dividing the character string into four character strings.

5. The playback device of claim 4, wherein
at least one of upper digits of the medium ID is zero, and at least one of the subdirectories is provided with a directory name composed of number zeros,
the application outputs, to the reader, a file path in a format in which the number zeros are omitted, and instructs the reader to acquire the reference information, and
the reader converts the file path in the format in which the number zeros are omitted, into a file path of the second recording medium, and acquires the reference information based on the converted file path.

6. The playback device of claim 1, wherein
the file path of the first recording medium is represented with use of a directory name and a file name that are each composed of 255 characters or less.

7. The playback device of claim 1, wherein
the search performed by the searcher includes a process of receiving, from the application, the file path in the first file system format, and judging whether a file path of the second recording medium that corresponds to the file path in the first file system format has been written in the reference information, and
when the accessible file is not found in the reference information, the reader reads, from the first recording medium, a file whose location is specified by the file path in the first file system format.

8. The playback device according to claim 1, wherein the first recording medium comprises a BD-ROM.

9. The playback device according to claim 8, further comprising a virtual file system that creates a virtual package by merging a content stored on the BD-ROM with an additional content file that is stored in the second recording medium,
wherein the application requests to access the second recording medium with uses of file path in the first file system format, when the additional content file is accessed using the file path in the BD-ROM via the virtual package.

10. A system LSI for performing a playback process, based on a file recorded on one of (i) a first recording medium having a first file system format and (ii) a second recording medium having a second file system format, each of the first recording medium and the second recording medium being a removable recording medium that is removable from the playback device, the system LSI comprising:

a manager configured to, when the first recording medium is mounted in the playback device, read an application from the first recording medium and activate the application;

a gainer configured to gain an additional content corresponding to the first recording medium from an external device, in response to a request from the application;

a writer configured to, in response to a request from the application, write a file including the additional content into a region of the second recording medium, the region being specified by a file path attached to the additional content;

a searcher configured to, when the application requests to access the second recording medium with use of a file path in the first file system format, search for an accessible file on the second recording medium based on reference information; and a reader configured to, (i) if the accessible file is found by the search, read the accessible file from the second recording medium, and (ii) if the accessible file is not found by the search, read a file from the first recording medium, wherein the reference information has been recorded on the second recording medium, and indicates a file path in the second file system format that corresponds to the file path in the first file system format, the file path in the first file system format includes a plurality of identifiers for identifying the first recording medium, the file path in the second file system format indicated by the reference information includes parts of one of the identifiers, the parts being used to specify the accessible file and obtained by dividing the one of the identifiers into parts that each have a length complying with the second file system format, and the writer writes the file into the region specified with use of the file path including the parts of the one of the identifiers.

11. A playback method that causes a computer to perform a playback process, based on a file recorded on one of (i) a first recording medium having a first file system format and (ii) a second recording medium having a second file system format, each of the first recording medium and the second recording medium being a removable recording medium that is removable from a playback device, the playback method comprising:

when the first recording medium is mounted in the playback device, reading an application from the first recording medium and activating the application;

gaining an additional content corresponding to the first recording medium from an external device, in response to a request from the application;

in response a request from the application, writing a file including the additional content into a region of the second recording medium, the region being specified by a file path attached to the additional content;

when the application requests to access the second recording medium with use of a file path in the first file system format, searching for an accessible file on the second recording medium based on reference information; and (i) if the accessible file is found by the search, reading the accessible file from the second recording medium, and (ii) if the accessible file is not found by the search, reading a file from the first recording medium, wherein the reference information has been recorded on the second recording medium, and indicates a file path in the second file system format that corresponds to the file path in the first file system format, the file path in the first file system format includes a plurality of identifiers for identifying the first recording medium, the file path in the second file system format indicated by the reference information includes parts of one of the identifiers, the parts being used to specify the accessible file and obtained by dividing the one of the identifiers into parts that each have a length complying with the second file system format, and in the writing, the file is written into the region specified with use of the file path including the parts of the one of the identifiers.

* * * * *